United States Patent
Kim et al.

(10) Patent No.: US 11,968,641 B2
(45) Date of Patent: Apr. 23, 2024

(54) METHOD BY WHICH USER EQUIPMENT TRANSMITS SRS IN WIRELESS COMMUNICATION SYSTEM, AND APPARATUS

(71) Applicant: LG ELECTRONICS INC., Seoul (KR)

(72) Inventors: Dongkyu Kim, Seoul (KR); Sukhyon Yoon, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 17/430,193

(22) PCT Filed: Dec. 31, 2019

(86) PCT No.: PCT/KR2019/018814
§ 371 (c)(1),
(2) Date: Aug. 11, 2021

(87) PCT Pub. No.: WO2020/166818
PCT Pub. Date: Aug. 20, 2020

(65) Prior Publication Data
US 2022/0159596 A1    May 19, 2022

Related U.S. Application Data

(60) Provisional application No. 62/806,112, filed on Feb. 15, 2019.

(51) Int. Cl.
*H04W 56/00* (2009.01)
*H04B 17/336* (2015.01)
(Continued)

(52) U.S. Cl.
CPC ........ *H04W 56/005* (2013.01); *H04B 17/336* (2015.01); *H04L 5/0051* (2013.01); *H04W 24/10* (2013.01); *H04W 56/001* (2013.01)

(58) Field of Classification Search
CPC . H04W 56/005; H04W 24/10; H04W 56/001; H04B 17/336; H04L 5/0051
See application file for complete search history.

(56) References Cited

U.S. PATENT DOCUMENTS

| | | | |
|---|---|---|---|
| 2015/0189610 A1* | 7/2015 | Siomina | H04L 5/14 370/280 |
| 2016/0234670 A1* | 8/2016 | Zhang | H04W 56/001 |

(Continued)

FOREIGN PATENT DOCUMENTS

| | | | | |
|---|---|---|---|---|
| WO | WO-2016164841 A1 * | 10/2016 | | H04W 56/001 |
| WO | 2018203680 A1 | 11/2018 | | |
| WO | WO-2018203680 A1 * | 11/2018 | | H04L 25/0224 |

OTHER PUBLICATIONS

Huawei, HiSilicon, "Discussion on UE-UE measurement for CLI management", 3GPP TSG RAN WG1 Ad-Hoc Meeting 1901, Jan. 21-25, 2019, R1-1900052.

(Continued)

*Primary Examiner* — Deepa Belur
(74) *Attorney, Agent, or Firm* — BRYAN CAVE LEIGHTON PAISNER LLP

(57) ABSTRACT

A method by which a transmission user equipment (UE) transmits a sounding reference signal (SRS) in a wireless communication system, according to the present disclosure, can comprise the steps of: receiving, from a base station, first configuration information including a timing advance and/or a timing advance offset; receiving, from the base station, second configuration information including SRS configuration; and transmitting an SRS to a reception UE on the basis of the first configuration information and the second con- (Continued)

figuration information. The timing advance is the same as the downlink reception timing of the reception UE, and the timing advance offset can be set to transmit the SRS. The timing advance can have a value corresponding to the downlink reception timing of the reception UE.

11 Claims, 22 Drawing Sheets

(51) Int. Cl.
*H04L 5/00* (2006.01)
*H04W 24/10* (2009.01)

(56) References Cited

U.S. PATENT DOCUMENTS

| | | | |
|---|---|---|---|
| 2017/0238131 A1* | 8/2017 | Dai | H04W 64/00 455/456.1 |
| 2019/0305833 A1* | 10/2019 | Kim | H04B 7/0413 |
| 2021/0392597 A1* | 12/2021 | Xu | H04W 56/00 |
| 2022/0060265 A1* | 2/2022 | Xu | H04W 24/08 |
| 2022/0103270 A1* | 3/2022 | Miao | H04B 17/345 |
| 2023/0055304 A1* | 2/2023 | Shim | H04B 17/318 |

OTHER PUBLICATIONS

Ericsson, "On UE-side cross-link interference measurement and reporting", 3GPP TSG RAN WG1 Meeting Ad-Hoc Meeting 1901, Jan. 21-25, 2019, R1-1900758.

Qualcomm Incorporated, "Signal transmission and measurement for UE-to-UE Cli", 3GPP TSG RAN WG1 AdHoc Meeting 1901, Jan. 21-25, 2019, R1-1900892.

Samsung, "Cross-link interference measurements and reporting to a UE", 3GPP TSG RAN WG1 Ad-Hoc Meeting 1901, Jan. 21-25, 2019, R1-1901063.

* cited by examiner

[FIG. 1]
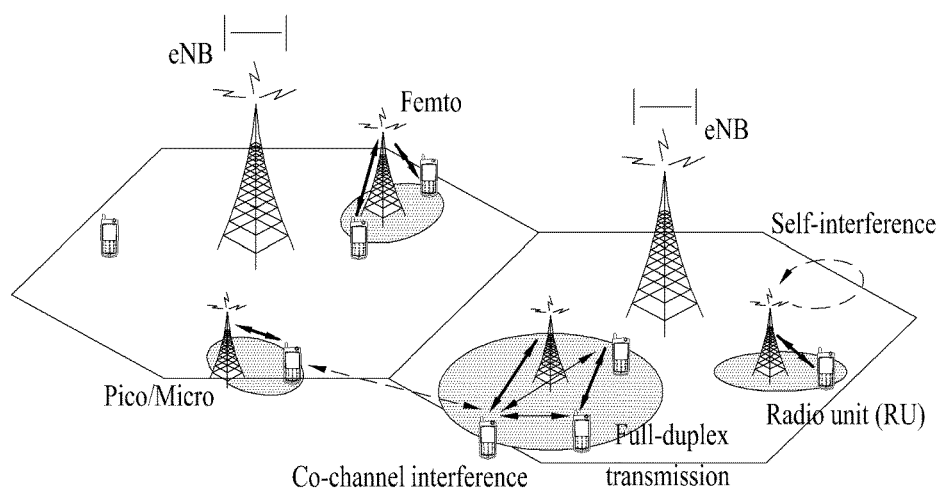

[FIG. 2a]
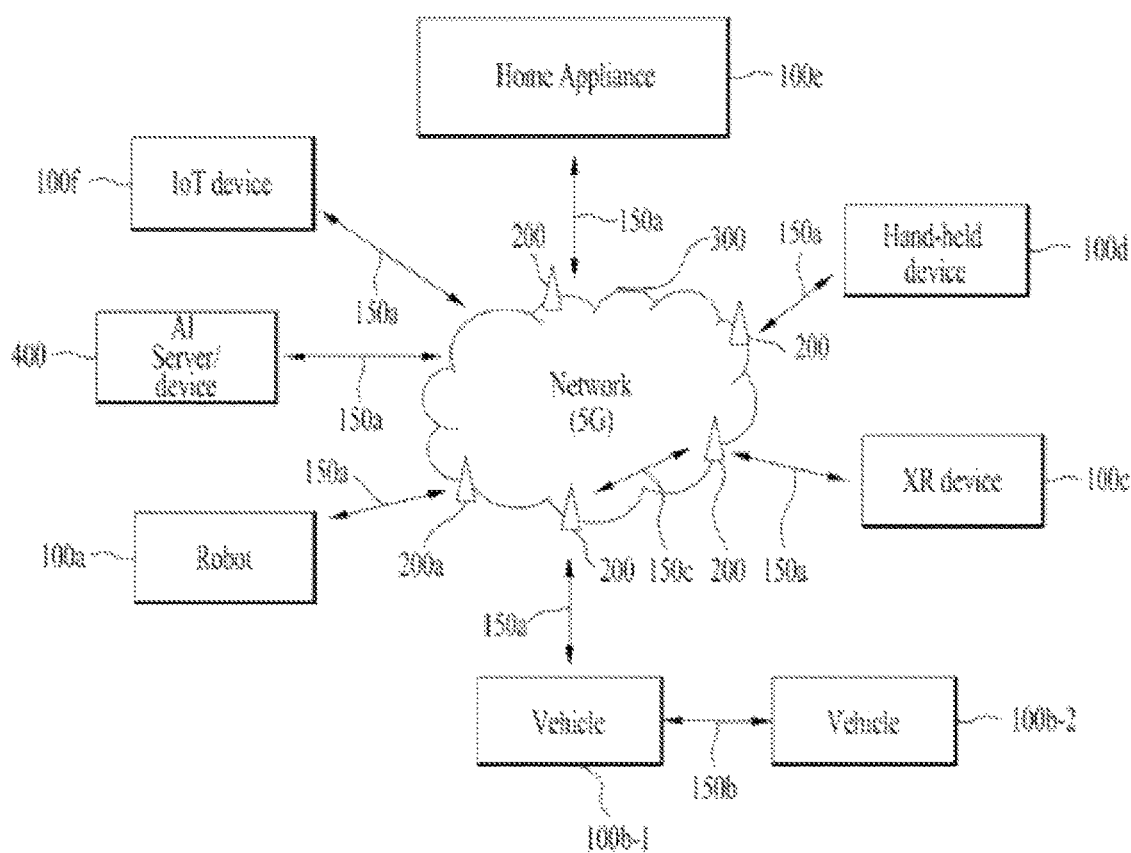

[FIG. 2b]
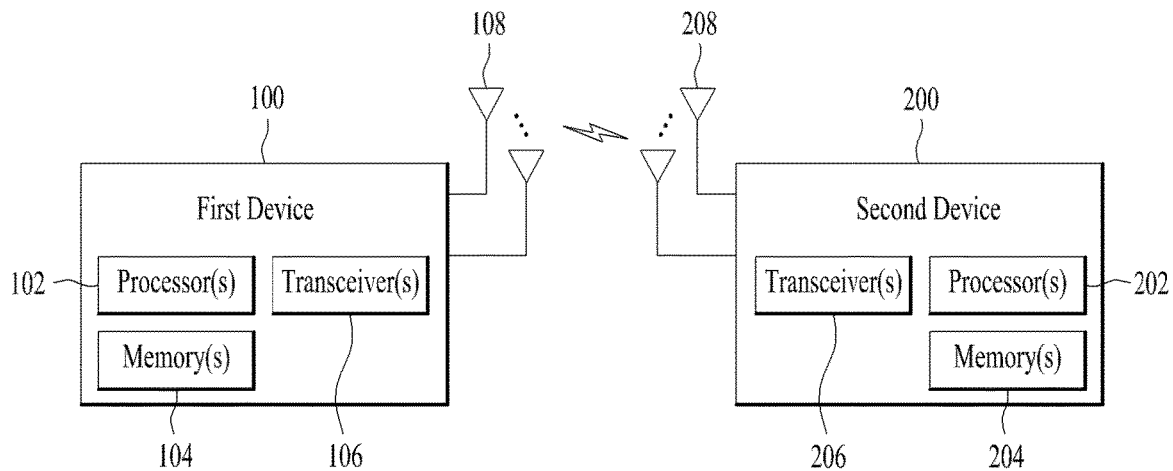
[FIG. 2c]
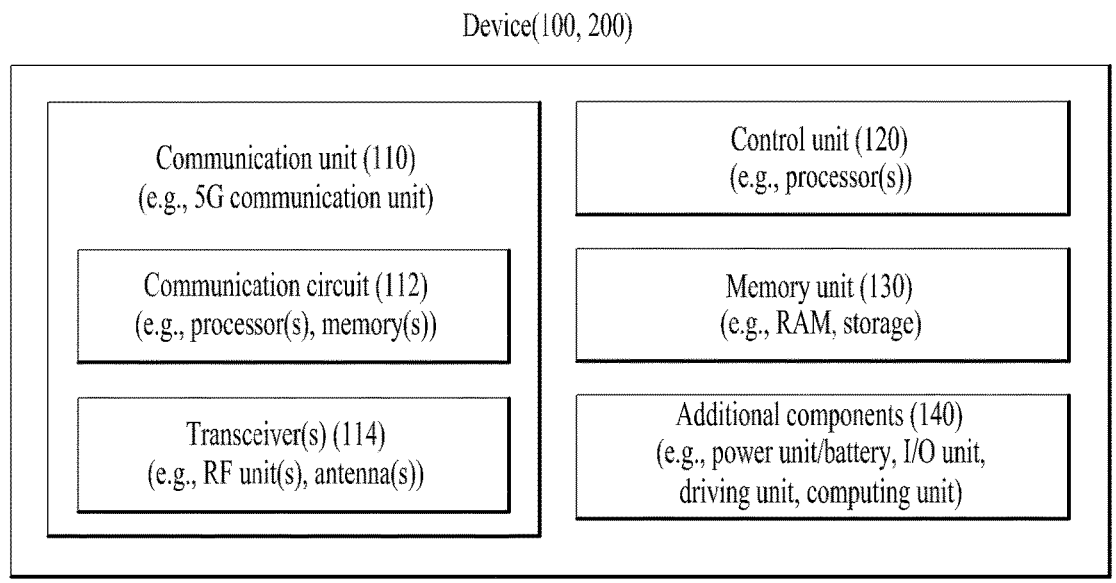

[FIG. 3a]
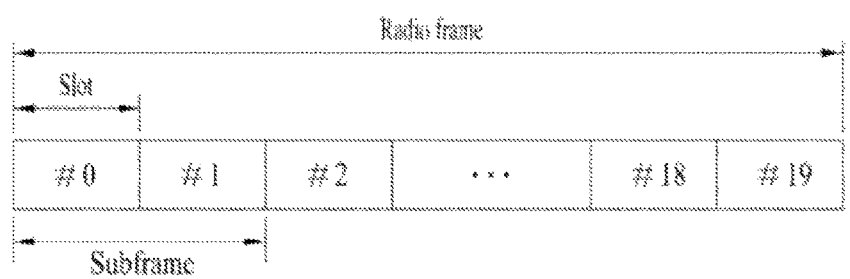
(a)
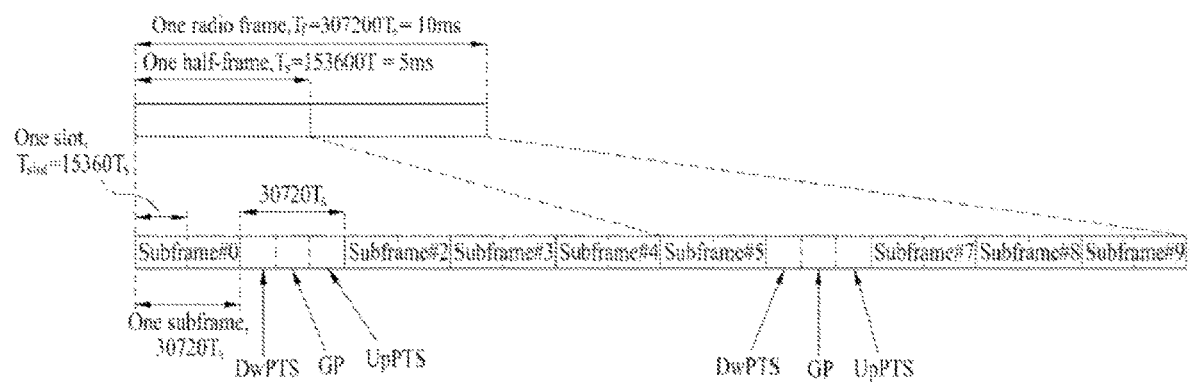
(b)

[FIG. 3b]
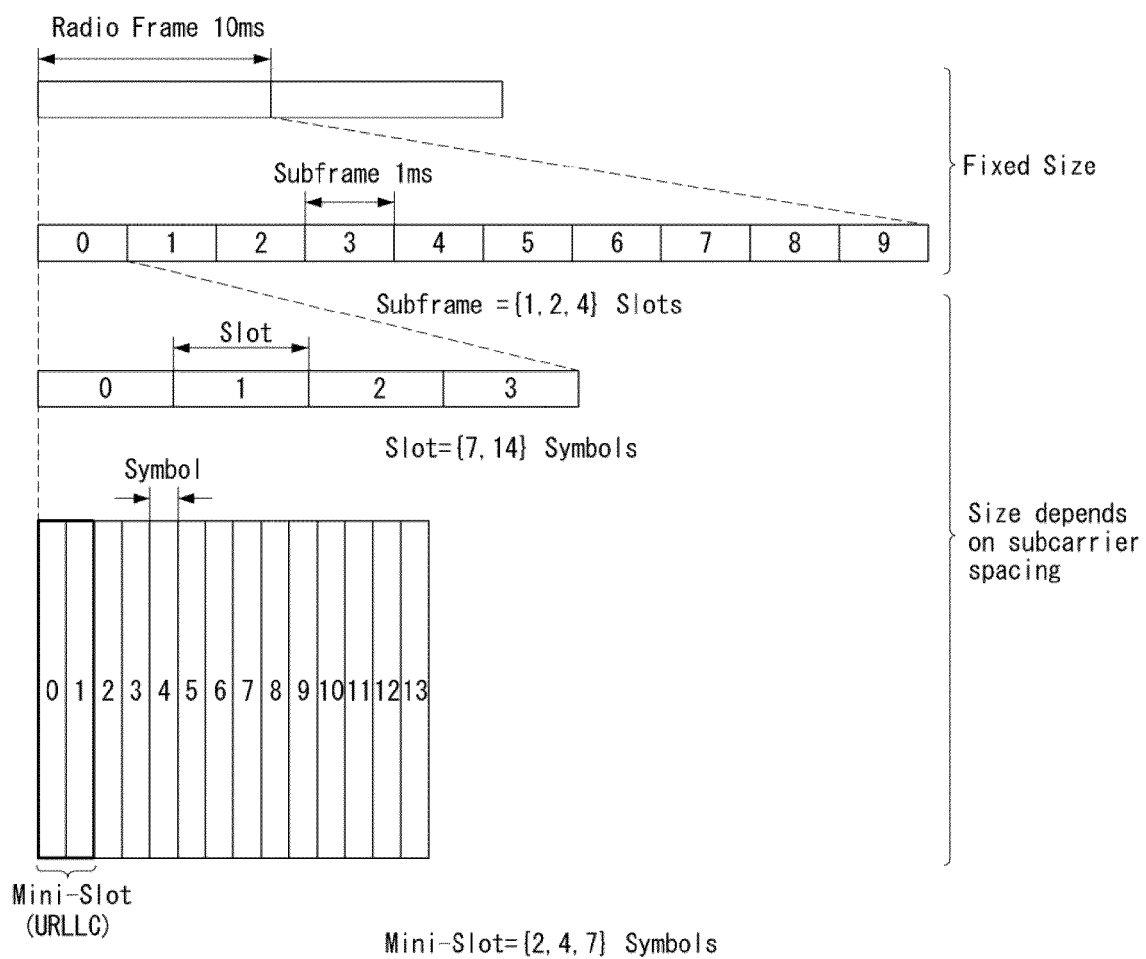

[FIG. 4a]
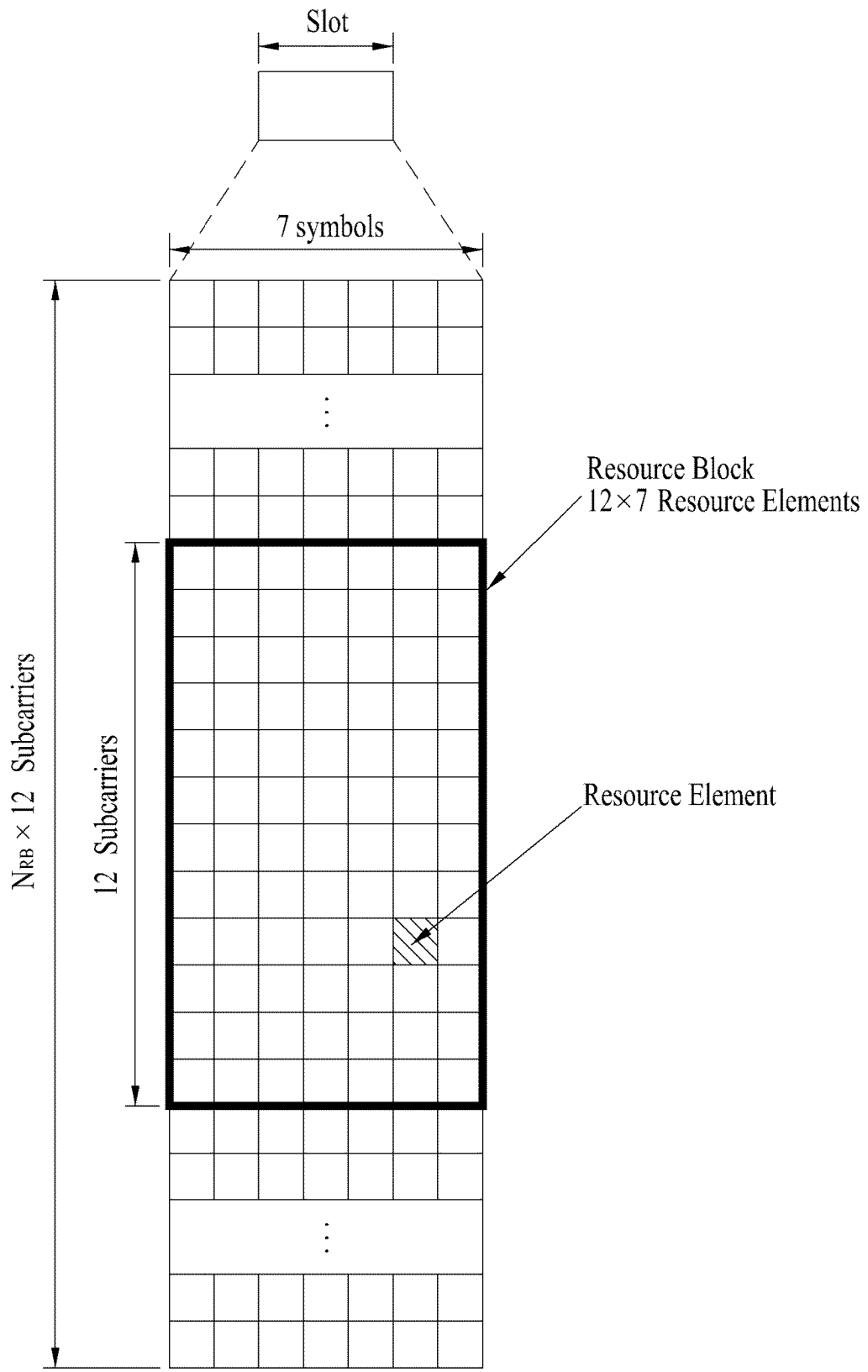

[FIG. 4b]
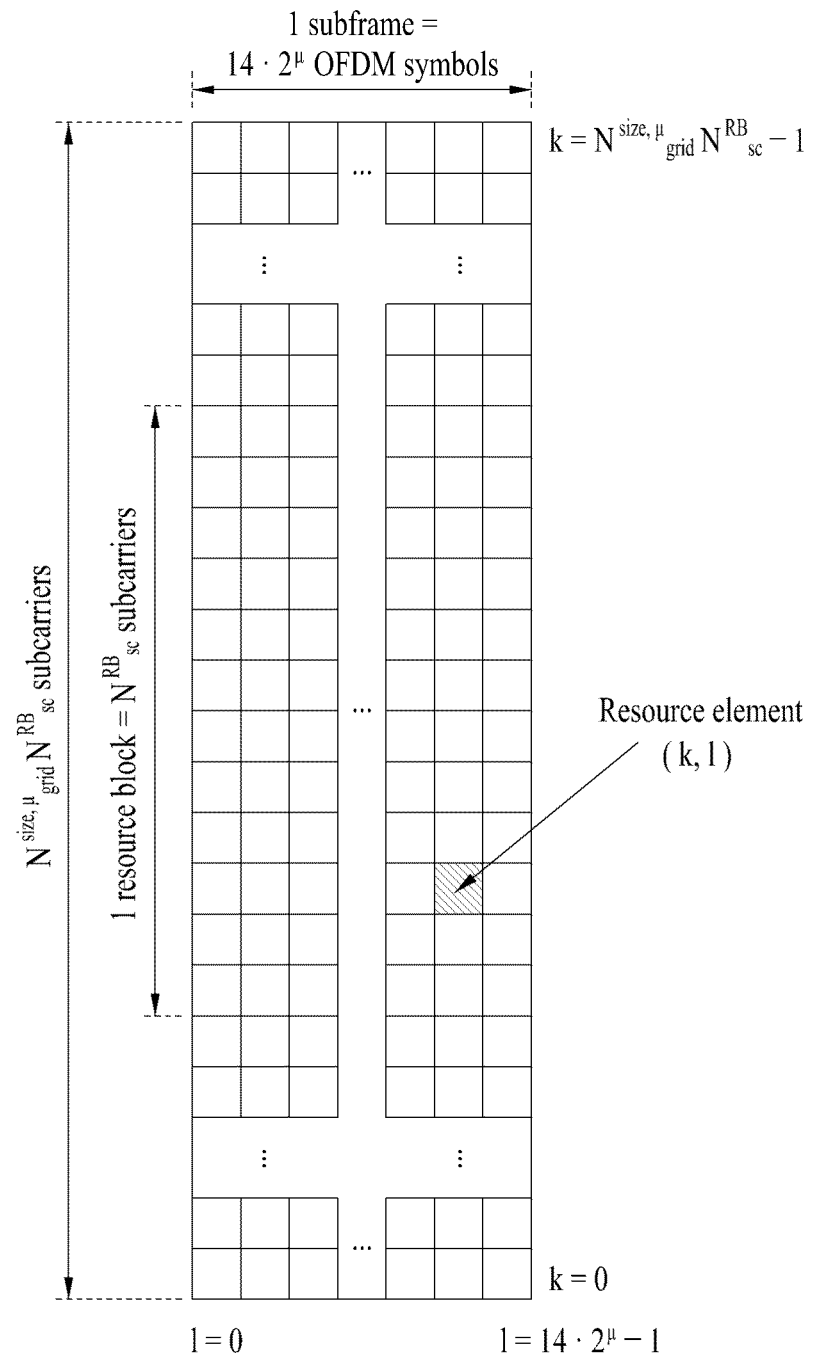

[FIG. 5]
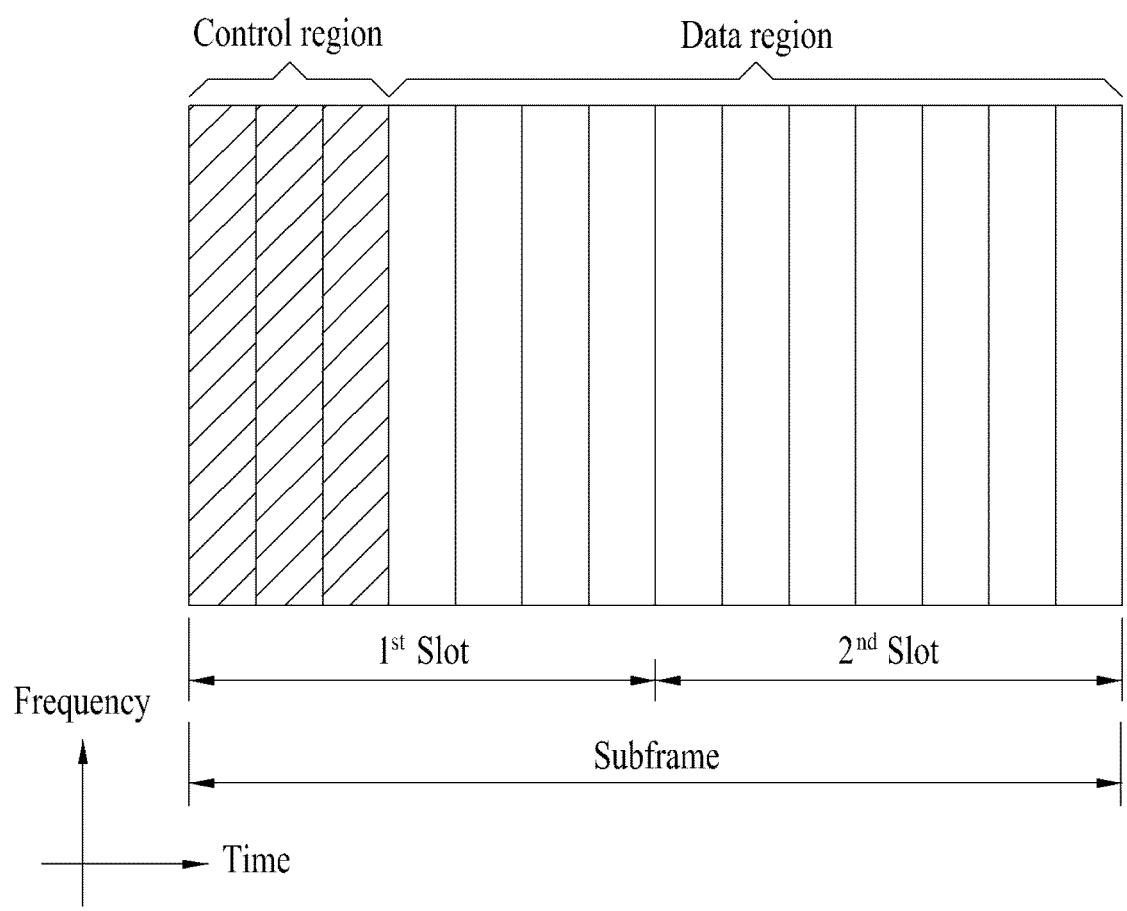

[FIG. 6]
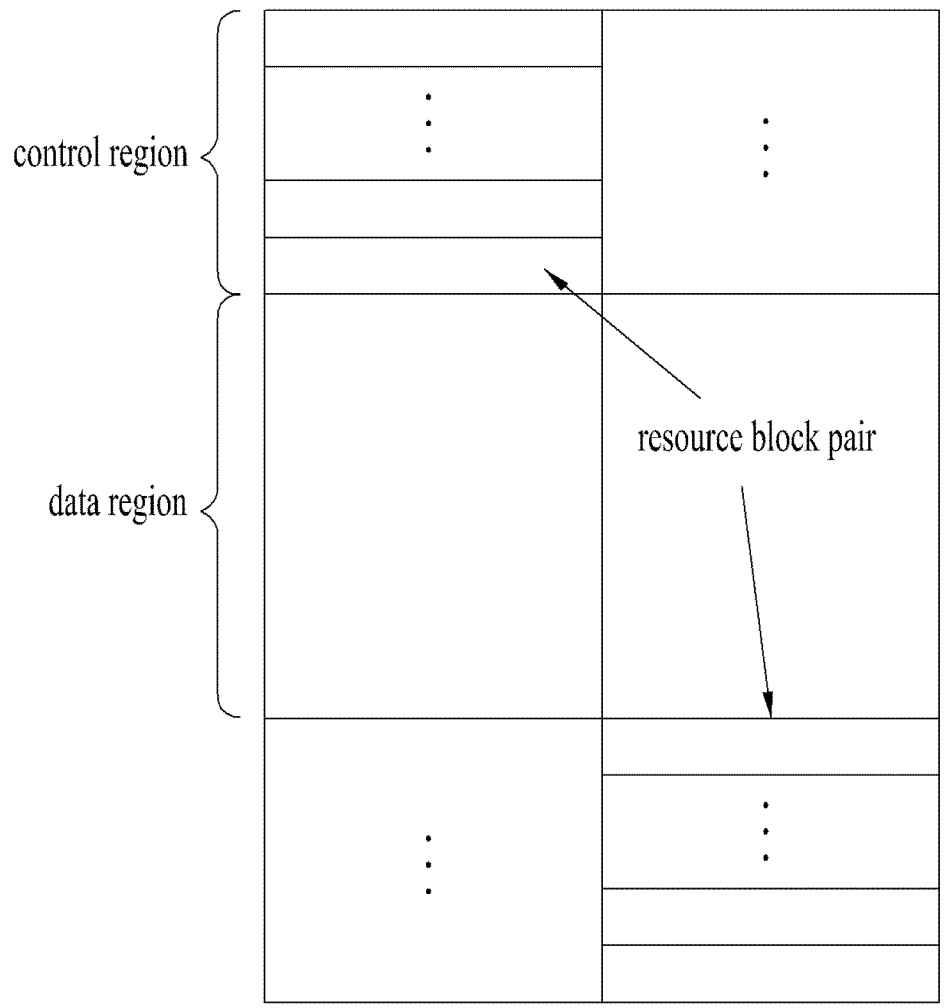
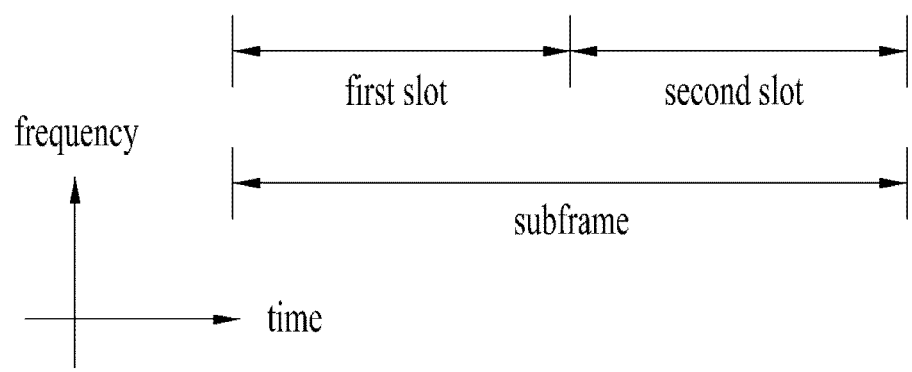

[FIG. 7]
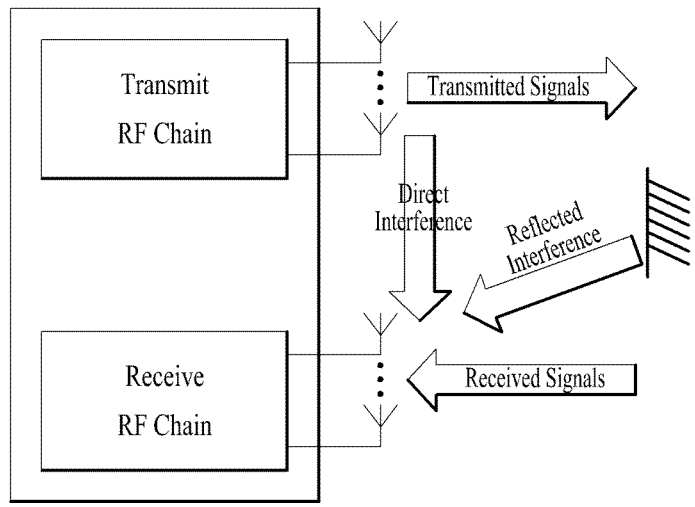
[FIG. 8]
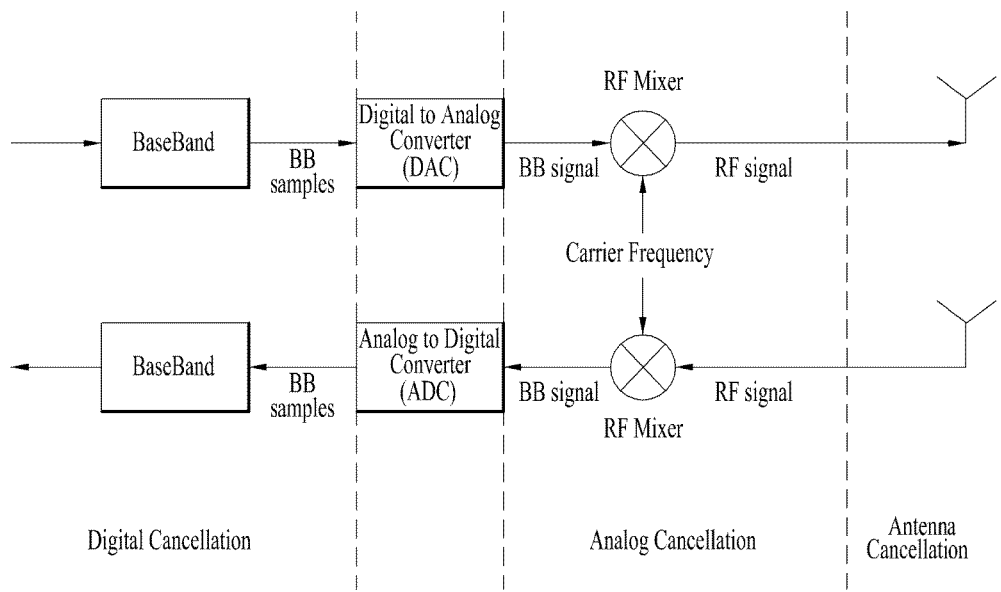

[FIG. 9]
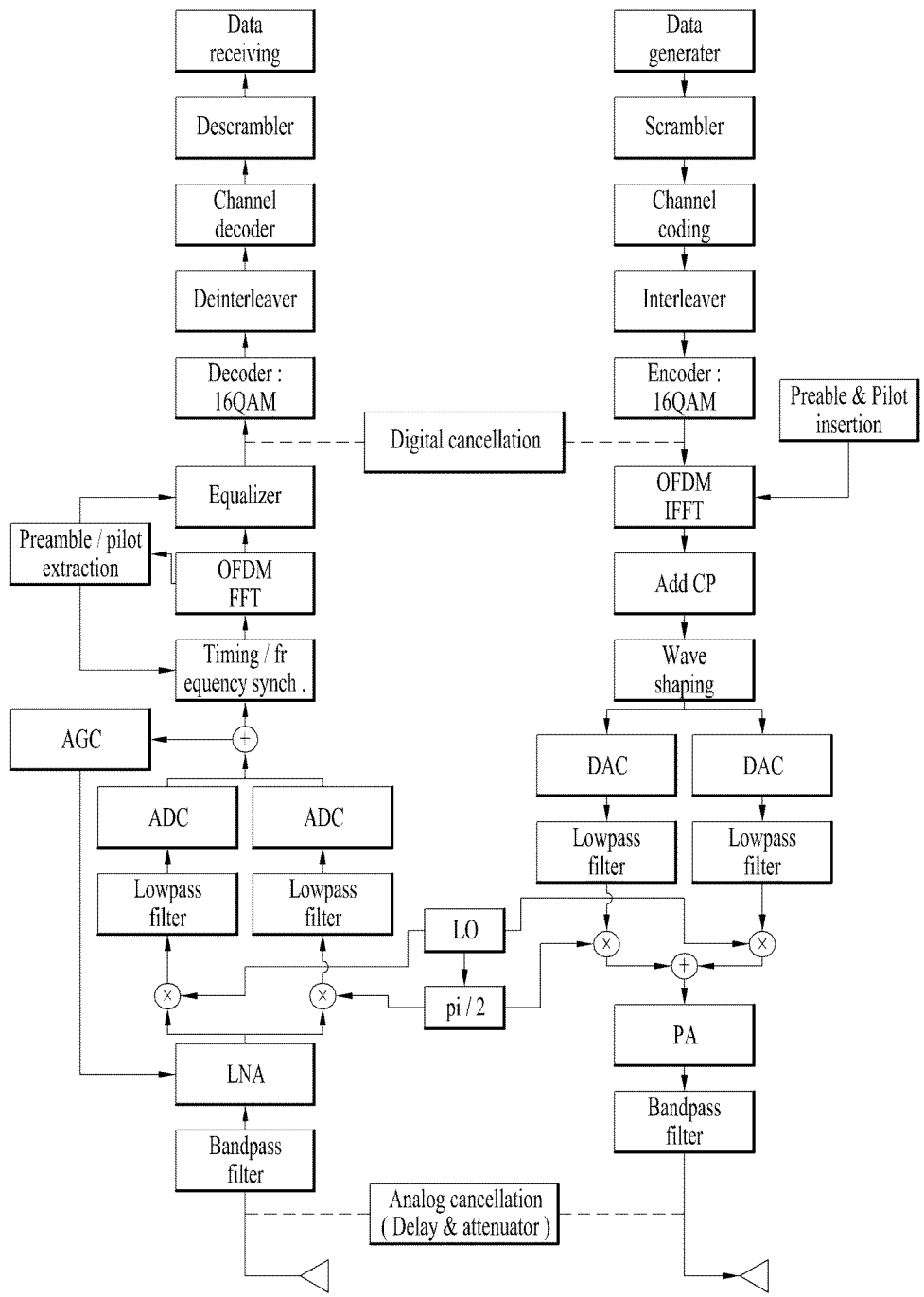

[FIG. 10]
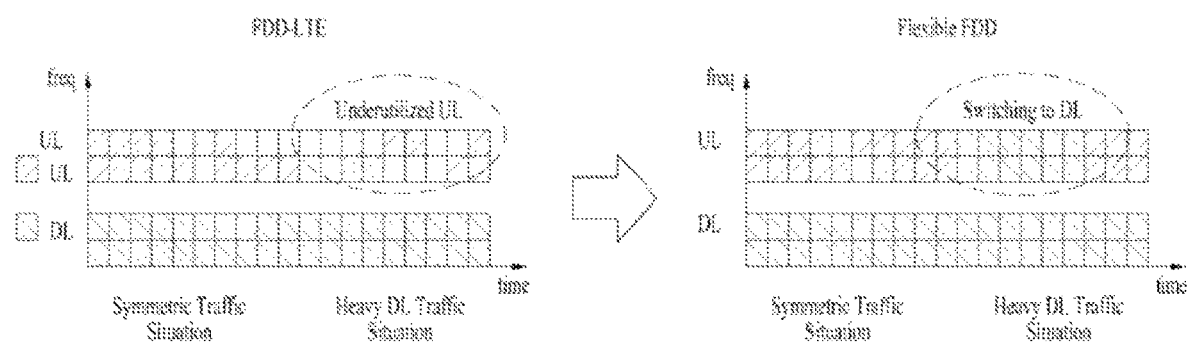

[FIG. 11]
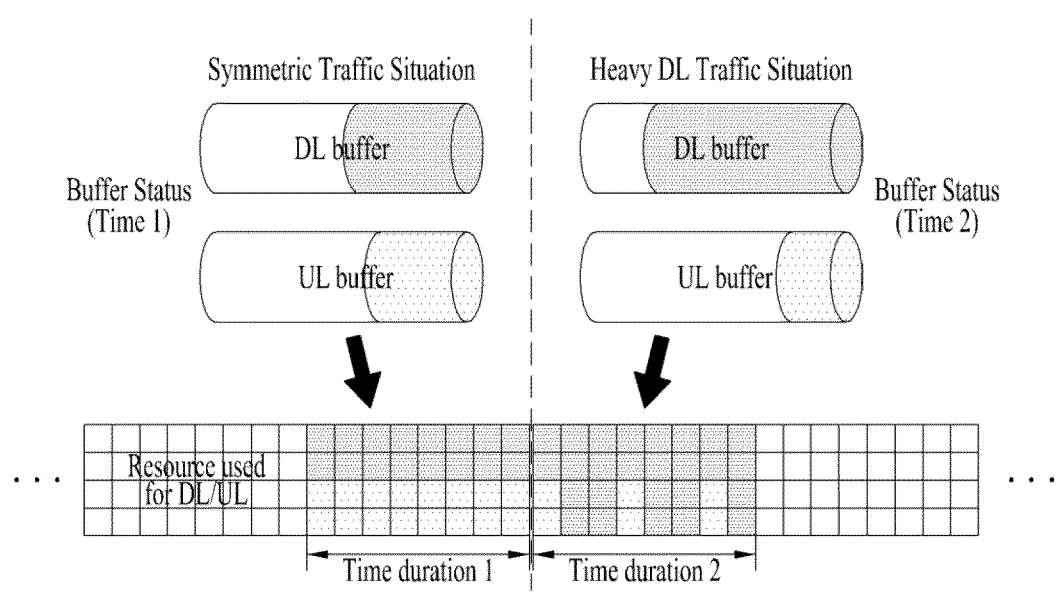

[FIG. 12]
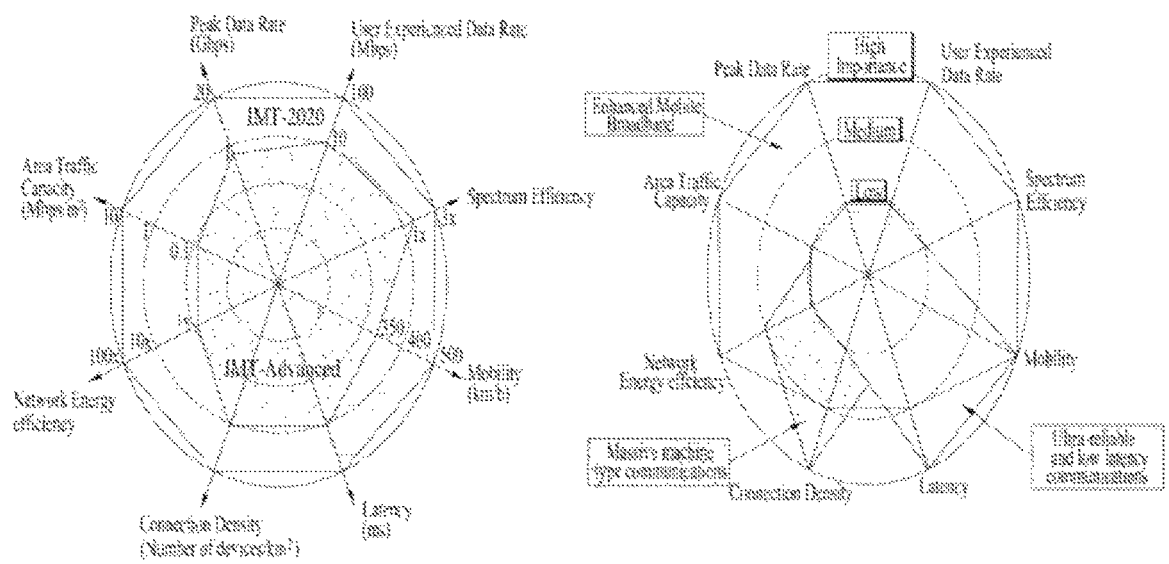

[FIG. 13]
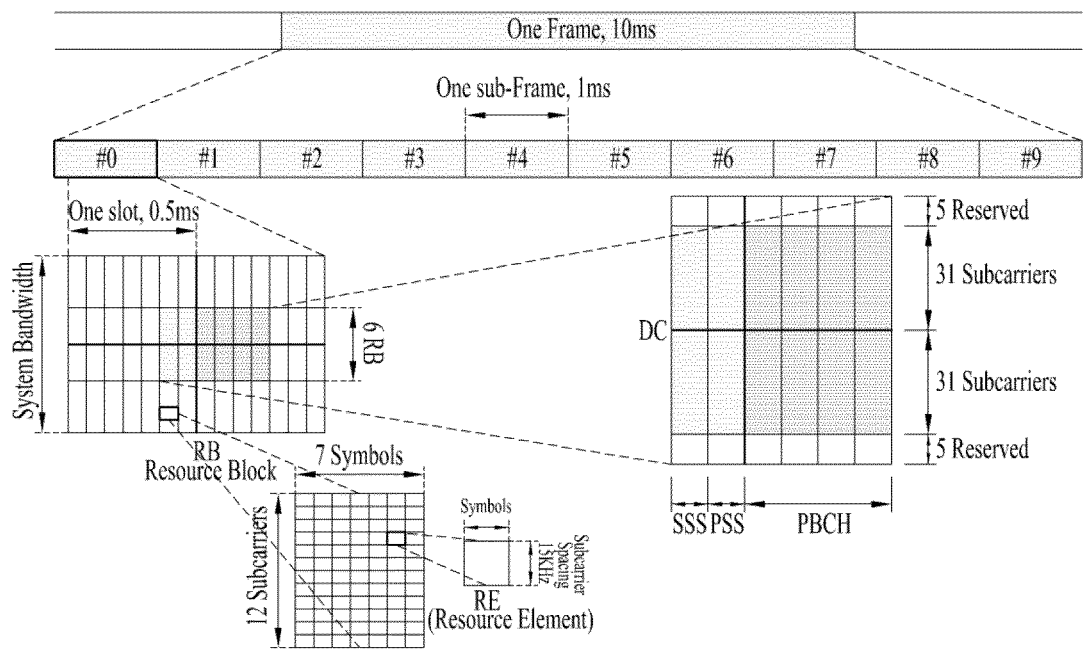
[FIG. 14a]
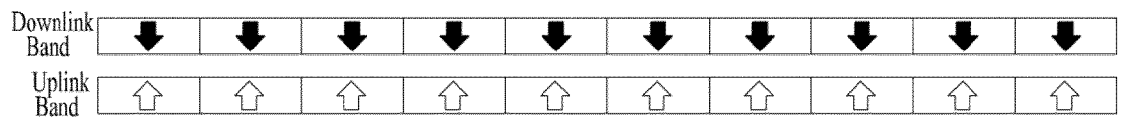
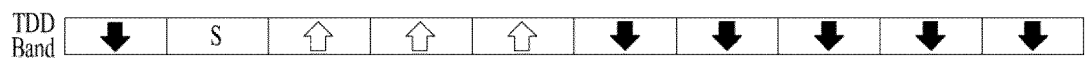

[FIG. 14b]
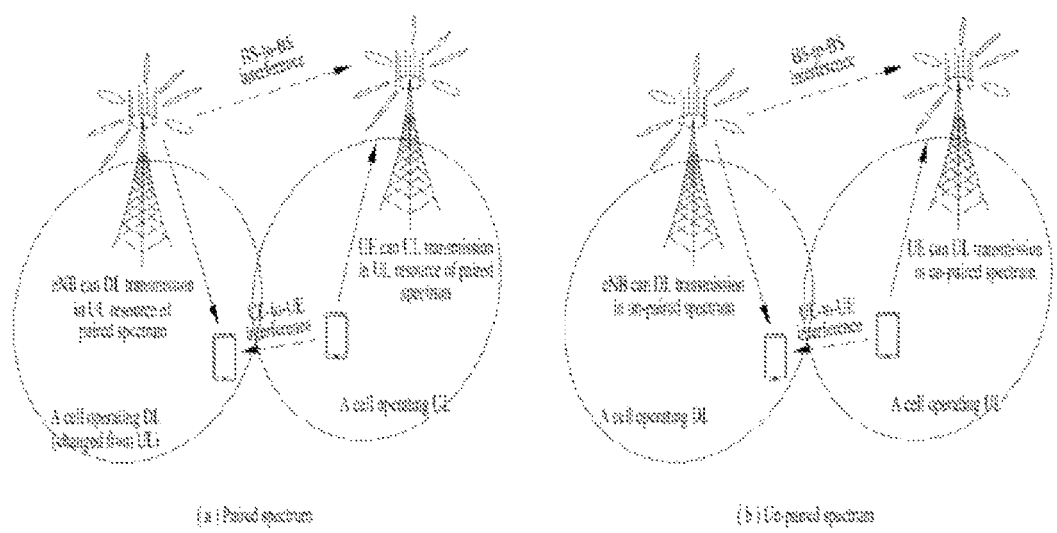

[FIG. 15a]
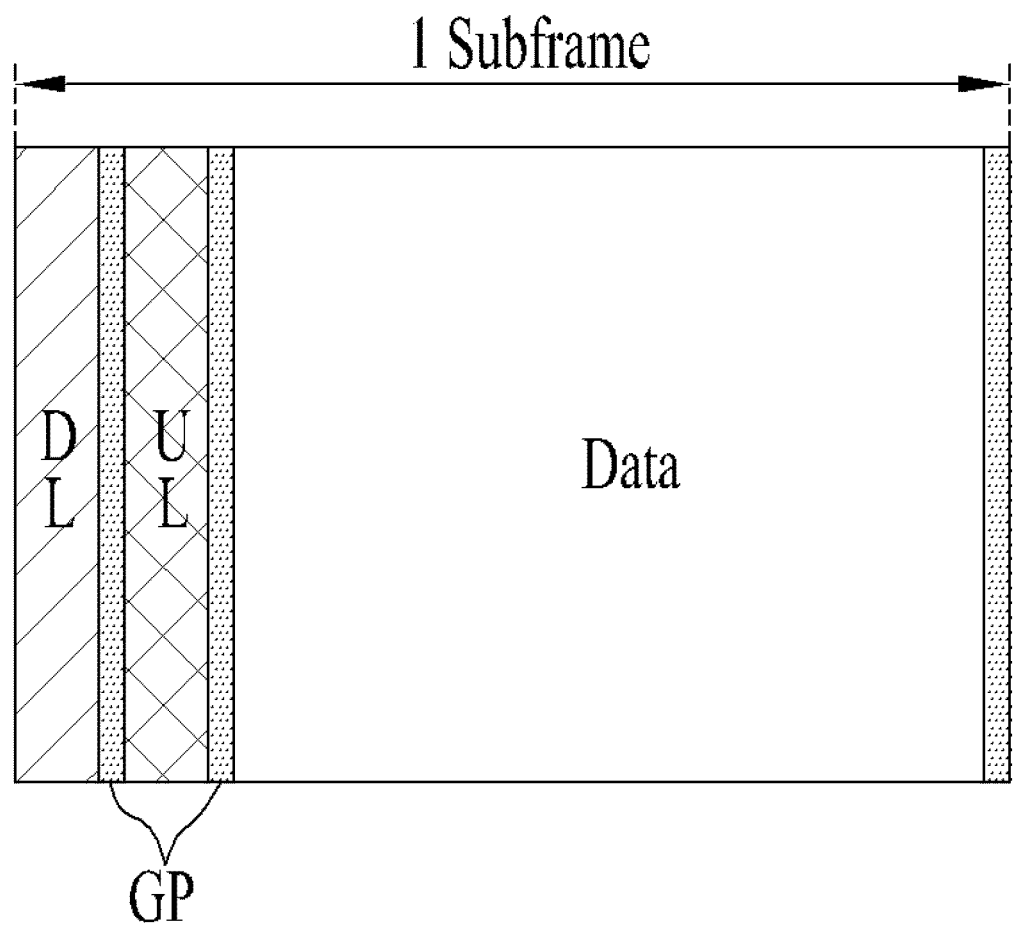

[FIG. 15b]
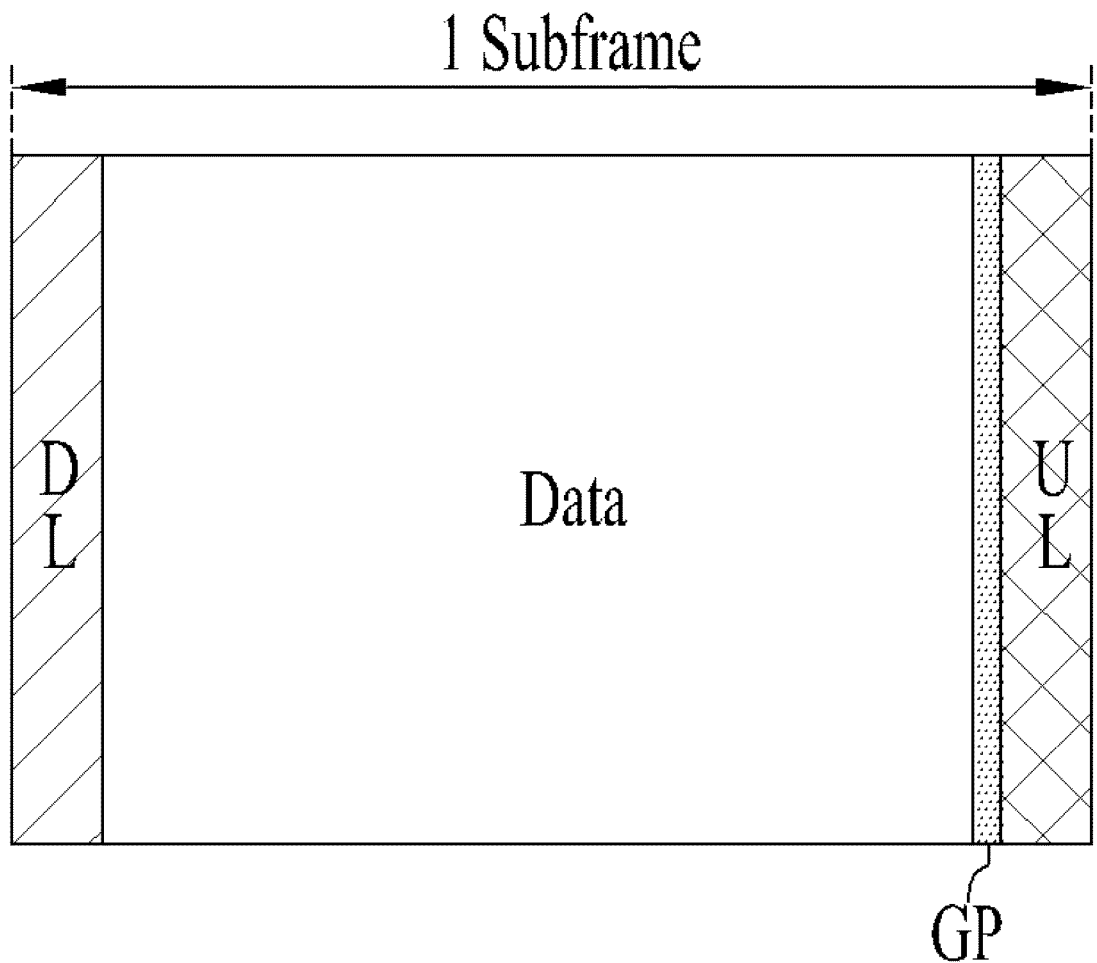
[FIG. 16]
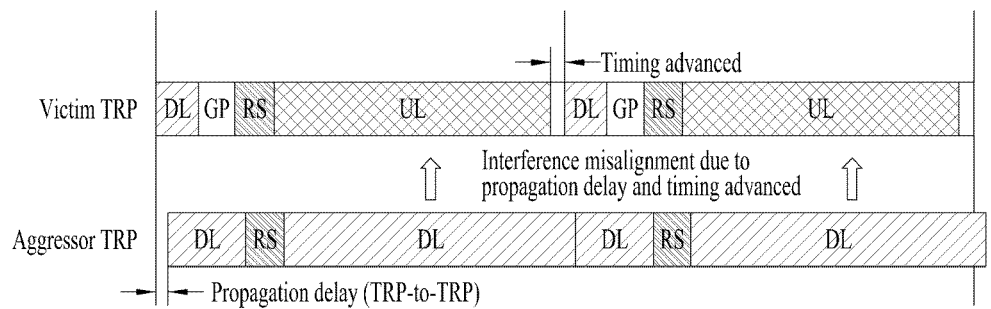

[FIG. 17]
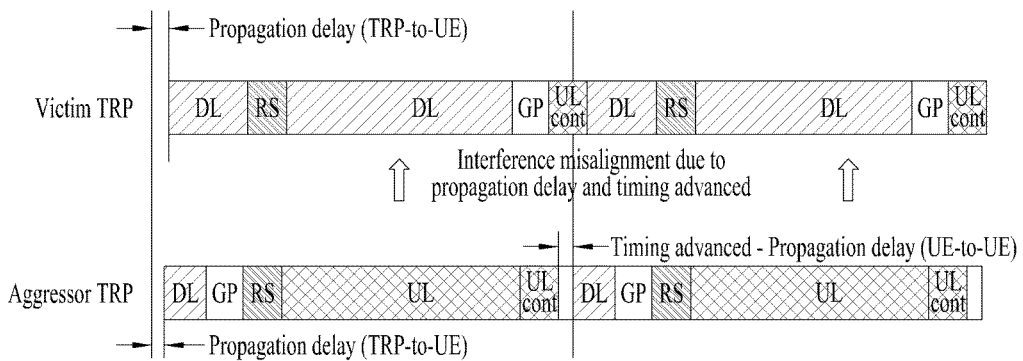
[FIG. 18]
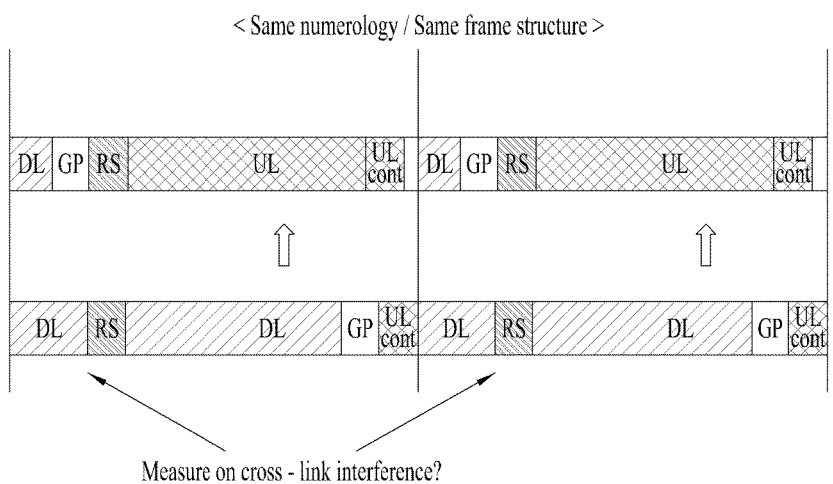

[FIG. 19]
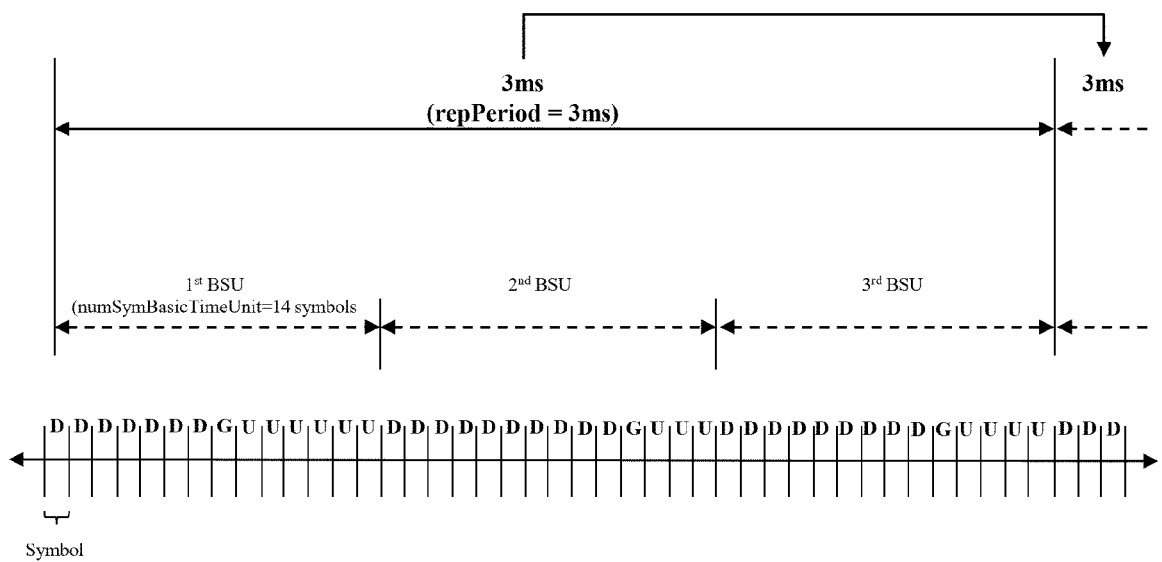

[FIG. 20]
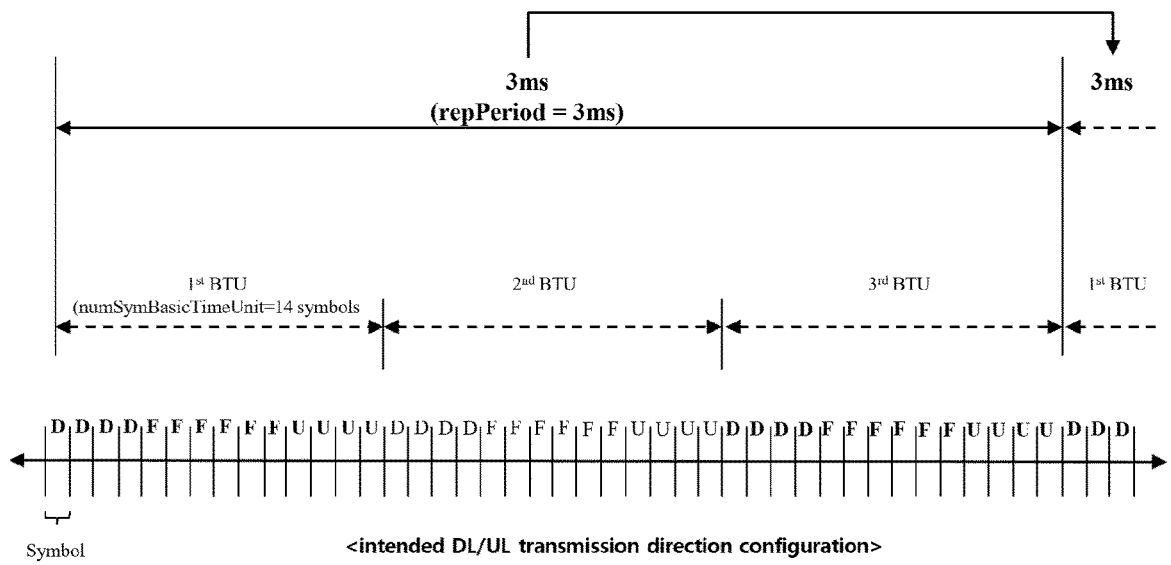
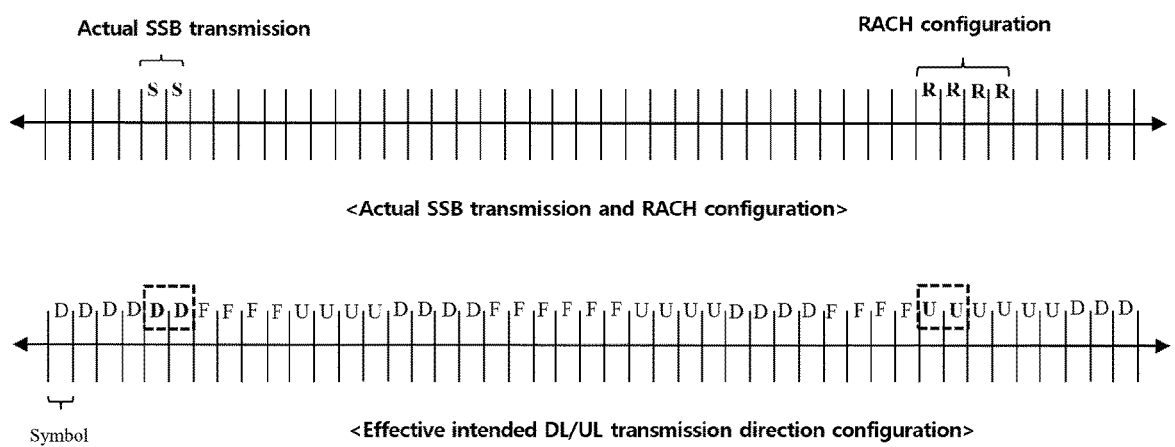

[FIG. 21]
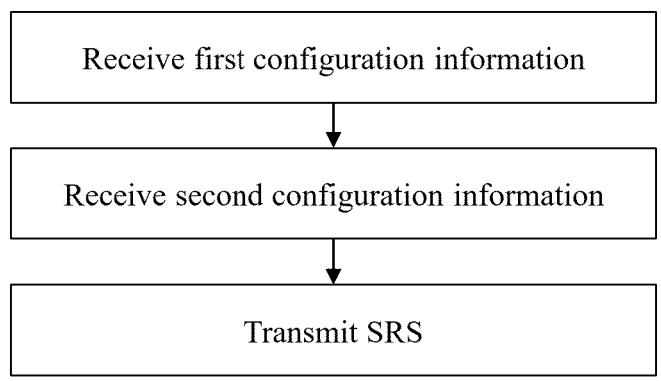
[FIG. 22]
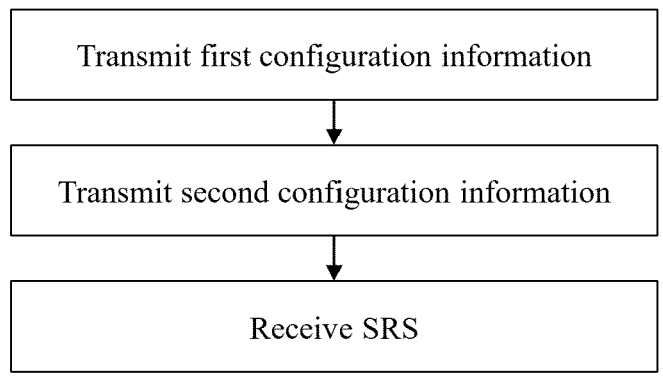

METHOD BY WHICH USER EQUIPMENT TRANSMITS SRS IN WIRELESS COMMUNICATION SYSTEM, AND APPARATUS

This application is the National Stage filing under 35 U.S.C. 371 of International Application No. PCT/KR2019/018814 filed on Dec. 31, 2019, which claims priority to U.S. Provisional Application No. 62/806,112 filed on Feb. 15, 2019, the contents of which are all hereby incorporated by reference herein in their entirety.

TECHNICAL FIELD

The present disclosure relates to wireless communication, and more particularly, to a method for transmitting a sounding reference signal (SRS) for measurement of remote cross-link interference (remote CLI) by a user equipment, and an apparatus.

BACKGROUND ART

Compared to conventional half duplex communication in which time or frequency resources are divided orthogonally, full-duplex communication doubles a system capacity in theory by allowing a node to perform transmission and reception simultaneously.

The present disclosure relates to UE-to-UE measurement and reporting for mitigation or cancellation of cross-link interference between wireless devices in a flexible duplex radio transmission system that assigns a previously assigned DL or UL band to UL or DL that is a different duplex as an intermediate step of a realistic evolution direction of the Full-Duplex Radio (FDR) technology that a random wireless device simultaneously performs transmission and reception on a single frequency transmission band.

FIG. 1 is a conceptual diagram of a UE and a base station (BS) which support full-duplex radio (FDR).

In the FDR situation illustrated in FIG. 1, the following three types of interference are produced.

Intra-device self-interference: Because transmission and reception take place using the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

When full-duplex communication is used, cross-link interference (CLI) may occur between BSs. Due to environmental factors, CLI may occur between BSs that are distant from each other. The environmental factors may include an atmospheric duct effect. The atmospheric duct is a horizontal layer in the lower atmosphere in which vertical refractive index gradients are formed such that radio signals are guided and ducted to follow the curvature of the earth. The radio signals are subject less attenuation than the case in which the atmospheric duct is not present, so that the radio signals may further be transmitted. A procedure of measuring and managing remote CLI is needed.

DISCLOSURE

Technical Problem

One technical task of the present disclosure is to provide a method and apparatus for cancelling remote cross-link interference.

Another technical task of the present disclosure is to provide a method and apparatus for transmitting a Sounding Reference Signal (SRS) by a User Equipment (UE) to cancel remote Cross-link Interference (CLI).

Another technical task of the present disclosure is to provide a method and apparatus for receiving a Sounding Reference Signal (SRS) by a Base Station (BS) to cancel remote Cross-link Interference (CLI).

It will be appreciated by persons skilled in the art that the technical tasks that could be achieved with the present disclosure are not limited to what has been particularly described hereinabove and the above and other technical tasks that the present disclosure could achieve will be more clearly understood from the following detailed description.

Technical Solution

In one aspect of the present disclosure, a method for transmitting a sounding reference signal (SRS) by a transmitting user equipment (UE) in a wireless communication system may include receiving first configuration information including at least one of a timing advance and a timing advance offset from a base station, receiving second configuration information including SRS configuration from the base station, and transmitting an SRS to a receiving UE based on the first configuration information and the second configuration information.

The timing advance may be the same as a downlink reception timing of the receiving UE, and the timing advance offset may be configured to transmit the SRS.

The timing advance may be the same as an uplink transmission timing advance of the transmitting UE, and the timing advance offset may be configured to transmit the SRS.

The SRS configuration may include an indicator indicating that the SRS is for UE-to-UE interference measurement.

The indicator indicating that the SRS is for UE-to-UE interference measurement may be included in each of SRS resource sets included in the SRS configuration.

The method may further include receiving, by the transmitting UE, a channel state information reference signal (CSI-RS) from the base station, and transmitting a CSI report to the base station based on the CSI-RS.

The CSI report may include information indicating that the transmitting UE is within a predetermined distance from a center of a cell of the base station, wherein, based on the information indicating that the transmitting UE is within the predetermined distance from the center of the cell of the base station, the first configuration information may include only the timing advance offset.

The method may further include receiving, by the transmitting UE, a channel state information reference signal (CSI-RS) from the base station, and transmitting a CSI report to the base station based on the CSI-RS.

The CSI report may include information indicating that the transmitting UE is outside a predetermined distance from a center of a cell of the base station, wherein, based on the information indicating that the transmitting UE is outside the predetermined distance from the center of the cell of the base station, the first configuration information may include both the timing advance and the timing advance offset.

In another aspect of the present disclosure, a transmitting user equipment (UE) for transmitting a sounding reference signal (SRS) in a wireless communication system may include a transceiver and at least one processor connected to the transceiver. The at least one processor may be configured to receive first configuration information including at least one of a timing advance and a timing advance offset from a base station, receive second configuration information including SRS configuration from the base station, and transmit an SRS to a receiving UE based on the first configuration information and the second configuration information.

Advantageous Effects

According to a proposal of the present disclosure, remote CLI may be cancelled by measuring the remote CLI.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

FIG. 1 is a diagram exemplarily illustrating a network supporting a full/half duplex communication operation mode of a UE according to the present invention.

FIG. 2A illustrates a communication system applied to the present disclosure.

FIG. 2B illustrates wireless devices applicable to the present disclosure.

FIG. 2C illustrates another example of wireless devices applied to the present disclosure.

FIG. 3A is a diagram illustrating exemplary radio frame structures used in 3GPP LTE/LTE-A system, which is an example of a wireless communication system.

FIG. 3B is a diagram illustrating a frame structure in NR.

FIG. 4A is a diagram illustrating an exemplary resource grid for the duration of a downlink slot used in 3GPP LTE/LTE-A system, which is an example of a wireless communication system.

FIG. 4B illustrates a resource grid in the NR system.

FIG. 5 is a diagram illustrating an exemplary structure of an downlink subframe used in 3GPP LTE/LTE-A system, which is an example of a wireless communication system.

FIG. 6 is a diagram illustrating an exemplary structure of a uplink subframe used in 3GPP LTE/LTE-A system, which is an example of a wireless communication system.

FIG. 7 is a diagram showing the concept of a transmission/reception link and self-interference (SI) in an FDR communication situation.

FIG. 8 is a diagram illustrating positions at which three self-IC schemes are applied, in a radio frequency (RF) Tx and Rx end (or an RF front end) of a device.

FIG. 9 is a block diagram of a self-IC device in a proposed communication apparatus in an OFDM communication environment based on FIG. 8.

FIG. 10 is a diagram showing the resource use efficiency comparison between the existing FDD-LTE and the flexible FDD wireless transmission scheme (Symmetric traffic situation and heavy DL data traffic situation).

FIG. 11 is a diagram showing resource utilization in flexible FDD.

FIG. 12 is a diagram for explaining relation between IMT 2020 core performance requirements for 5G and 5G performance requirements for each service scenario.

FIG. 13 is a diagram showing the LTE/LTE-A frame structure.

FIG. 14a is a diagram showing an example of FDD/TDD frame structure in LTE/LTE-A system.

FIG. 14b is a diagram illustrating examples of cross-link interference of a time division multiplexing (TDM)-based flexible duplex operation in a paired spectrum and in an unpaired spectrum.

FIG. 15 is a diagram showing an example of a self-contained subframe structure.

FIG. 16 is a diagram illustrating an example of a received signal and cross-link interference in a victim TRP (e.g., eNB).

FIG. 17 is a diagram illustrating an example of a received signal and cross-link interference in a victim UE.

FIG. 18 is a diagram illustrating an example when a DL RS and a UL RS have common design.

FIG. 19 is a diagram showing one example of intended DL/UL transmission direction configuration.

FIG. 20 is an exemplary diagram illustrating an effective intended DL/UL transmission direction configuration.

FIG. 21 is an exemplary diagram to describe an SRS transmitting procedure according to the present disclosure.

FIG. 22 is an exemplary diagram to describe an SRS receiving procedure according to the present disclosure.

MODE FOR DISCLOSURE

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system and 3GPP LTE-A, the following descriptions are applicable to other random mobile communication systems in a manner of excluding unique features of the 3GPP LTE and 3GPP LTE-A.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc. UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 2A illustrates a communication system 1 applied to the present disclosure.

Referring to FIG. 2A, the communication system 1 applied to the present disclosure includes wireless devices, BSs, and a network. The wireless devices refer to devices performing communication by radio access technology (RAT) (e.g., 5G new RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 2B illustrates wireless devices applicable to the present disclosure.

Referring to FIG. 2B, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 2A.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 2C illustrates another example of wireless devices applied to the present disclosure.

The wireless devices may be implemented in various forms according to use-cases/services (refer to FIG. 2A).

Referring to FIG. 2C, wireless devices 100 and 200 may correspond to the wireless devices 100 and 200 of FIG. 24 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2B. For example, the transceiver(s) 114 may include the one or more transceivers 106 and 206 and/or the one or more antennas 108 and 208 of FIG. 2B. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100*a* of FIG. 2A), the vehicles (100*b*-1 and 100*b*-2 of FIG. 2A), the XR device (100*c* of FIG. 2A), the hand-held device (100*d* of FIG. 2A), the home appliance (100*e* of FIG. 2A), the IoT device (100*f* of FIG. 2A), a digital broadcasting terminal, a hologram device, a public safety device, an MTC device, a medicine device, a FinTech device (or a finance device), a security device, a climate/environment device, the AI server/device (400 of FIG. 2A), the BSs (200 of FIG. 2A), a network node, etc. The wireless device may be mobile or fixed according to a use-case/service.

In FIG. 2C, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled by wire, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

FIG. 3A illustrates exemplary radio frame structures used in 3GPP LTE/LTE-A system, which is an example of a wireless communication system.

Regarding the usual representation of wireless transmission, when wireless transmission is performed between a base station and a wireless UE as wireless devices, a transmission from the base station to the wireless UE and a transmission from the wireless UE to the base station are commonly named a downlink (DL) transmission and an uplink (UL) transmission, respectively. a way of distinguishing radio resources between the downlink transmission and the uplink transmission is defined as duplex. A case of bidirectional transmission/reception by dividing a frequency band into a downlink transmission band and an uplink transmission band is represented as Frequency Division Duplex (FDD). And, a case of transmission/reception on the same frequency band by dividing a time domain radio resource into a downlink time duration resource and an uplink time duration resource is represented as Time Division Duplex (TDD).

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 3A(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 3A(b) illustrates the type-2 radio frame structure.

A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal.

Each half frame includes 5 subframes. A subframe denoted by 'D' is a subframe for a DL transmission, a subframe denoted by 'U' is a subframe for a UL transmission, a subframe denoted by 'S' is a special subframe including a downlink pilot time slot (DwPTS), a guard period (GP) and an uplink pilot time slot (UpPTS). The DwPTS is used for an initial cell search, a synchronization or a channel estimation in a user equipment. The UpPTS is used for a channel estimation in a base station and an uplink transmission synchronization of a user equipment. The guard period is a period for removing interference generated from an uplink due to a multipath delay of a DL signal between the uplink and the downlink.

In case of 5 ms DL-UL switch-point period, a special subframe S exists in every half frame. In case of 5 ms DL-UL switch-point period, it exists in a 1st half frame only. Subframe indexes 0 and 5 (subframe 0 and subframe 5) and DwPTS correspond to the interval for a DL transmission only. The UpPTS and a subframe right contiguous with the special subframe always correspond to an interval for a UL transmission. If multi-cells are aggregated, a user equipment can assume the same UL-DL configuration across all cells. And, guard periods of special subframes in different cells overlap each other by 1456 Ts at least. The above-described structures of the radio frame are just exemplary. And, the number of subframes included in a radio frame, the number of slots included in the subframe and the number of symbols included in the slot may be modified in various ways.

Table 1 in the following indicates a configuration (length of DwPTS/GP/UpPTS) of a special frame.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows UL-DL configuration in the type-2 frame structure of 3GPP LTE system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in the 3GPP LTE system, there are 7 types of UL-DL configurations in the type-2 frame structure. The respective configurations may differ from each other in the numbers or locations of DL subframes, special subframes and UL subframes. In the following description, various embodiments of the present invention shall be explained based on the UL-DL configurations of the type-2 frame structure shown in Table 2. Table 3 shows k values for TDD configurations 0 to 6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | | 4 | | | 6 | | | 4 | 6 |
| 2 | | | | 6 | | | | | 6 | |
| 3 | 6 | | | | | | | 6 | 6 | |

TABLE 3-continued

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 4 | | | | | | | | | 6 | 6 |
| 5 | | | | | | | | | 6 | |
| 6 | | 6 | 4 | | | | 7 | 4 | | 6 |

In the type-1 frame structure, HARQ-ACK received on PHICH assigned to a UE in subframe i is related to PUSCH transmission in subframe i-4. In the UL/DL configurations 1 to 6 of the type-2 frame structure, HARQ-ACK received on PHICH assigned to a UE in subframe i is related to PUSCH transmission in subframe i-k (k is shown in Table 3).

A UE HARQ-ACK procedure in 3GPP LTE/LTE-A system is schematically described as follows. The present invention shall be described based on the UE HARQ-ACK procedure in 3GPP LTE/LTE-A system.

TABLE 4

For Frame Structure type 2 UL/DL configuration 1-6, an HARQ-ACK received on the PHICH assigned to a UE in subframe i is associated with the PUSCH transmission in the subframe i-k as indicated by the table 3.
For Frame Structure type 2 UL/DL configuration 0, an HARQ-ACK received on the PHICH in the resource corresponding to $I_{PHICH} = 0$, assigned to a UE in subframe i is associated with the PUSCH transmission in the subframe i-k as indicated by the table 3. If, for Frame Structure type 2 UL/DL configuration 0, an HARQ-ACK received on the PHICH in the resource corresponding to $I_{PHICH} = 1$, assigned to a UE in subframe i is associated with the PUSCH transmission in the subframe i-6.
The physical layer in the UE shall deliver indications to the higher layers as follows:
For downlink subframe i, if a transport block was transmitted in the associated PUSCH subframe then:
  if ACK is decoded on the PHICH corresponding to the transport block in subframe i, ACK for that transport block shall be delivered to the higher layers;
  else NACK for that transport block shall be delivered to the higher layers.
For downlink subframe i, in case of a retransmission in the associated PUSCH subframe, if a transport block was disabled in the associated PUSCH subframe then ACK for that transport block shall be delivered to the higher layers.

A PHICH assignment procedure in 3GPP LTE/LTE-A system is schematically described as follows. The present invention shall be described based on the PHCI assignment procedure in 3GPP LTE/LTE-A system.

TABLE 5

For PUSCH transmissions scheduled from serving cell in subframe n, a UE shall determine the corresponding PHICH resource of serving cell c in subframe n + $k_{PHICH}$, where $k_{PHICH}$ is always 4 for FDD and is given in following table 6 for TDD. For subframe bundling operation, the corresponding PHICH resource is associated with the last subframe in the bundle.
The PHICH resource is identified by the index pair ($n_{PHICH}^{group}$, $n_{PHICH}^{seq}$) where $n_{PHICH}^{group}$ is the PHICH group number and $n_{PHICH}^{seq}$ is the orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} / N_{PHICH}^{group} \rfloor + n_{DMRS}) \bmod 2N_{SF}^{PHICH}$$

where
$n_{DMRS}$ is mapped from the cyclic shift for DMRS field (according to following table 6) in the most recent PDCCH with uplink DCI format [4] for the transport block(s) associated with the corresponding PUSCH transmission. $n_{DMRS}$ shall be set to zero, if there is no PDCCH with uplink DCI format for the same transport block, and TABLE 5-continued if the initial PUSCH for the same transport block is semi-persistently scheduled, or
if the initial PUSCH for the same transport block is scheduled by the random access response grant.
$N_{SF}^{PHICH}$ is the spreading factor size used for PHICH modulation as described in section 6.9.1 in [3].

$$I_{PRB\_RA} = \begin{cases} I_{PRB\_RA}^{lowest\_index} & \text{for the first } TB \text{ of a } PUSCH \text{ with associated } PDCCH \text{ or for the case of no associated } PDCCH \text{ when the number of negatively acknowledged } TBs \text{ is not equal to the number of } TBs \text{ indicated in the most recent } PDCCH \text{ associated with the corresponding } PUSCH \\ I_{PRB\_RA}^{lowest\_index} + 1 & \text{for a second } TB \text{ of a } PUSCH \text{ with associated } PDCCH \end{cases}$$

where $I_{PRB\_RA}^{lowest\_index}$ is the lowest PRB index in the first slot of the corresponding PUSCH transmission
$N_{PHICH}^{group}$ is the number of PHICH groups configured by higher layers as described in section 6.9 of [3], $$I_{PHICH} = \begin{cases} 1 & \text{for } TDD \text{ UL/DL configuration 0 } \textit{with } PUSCH \text{ transmission in subframe } n = 4 \text{ or } 9 \\ 0 & \text{otherwise} \end{cases}$$

The following table is to describe a subframe location of PHICH corresponding to PUSCH according to TDD UL/DL configuration. In subframe n, for the scheduled PUSCH transmission from a serving cell c, a UE may determine a PHICH resource of the corresponding serving cell C in subframe n+$k_{PHICH}$. In FDD, $k_{PHICH}$ is always 4. Namely, in FDD, when PUSCH is transmitted, PHICH corresponding to the PUSCH is transmitted in a fourth subframe after the PUSCH transmitted subframe. In case of TDD, a value of $k_{PHICH}$ will be determined according to Table 6.

TABLE 6

| TDD UL/DL Configuration | subframe index n |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 0 |   |   |   | 4 | 7 | 6 |   |   | 4 | 7 | 6 |
| 1 |   |   |   | 4 | 6 |   |   |   | 4 | 6 |   |
| 2 |   |   |   | 6 |   |   |   |   | 6 |   |   |
| 3 |   |   |   | 6 | 6 | 6 |   |   |   |   |   |
| 4 |   |   |   | 6 | 6 |   |   |   |   |   |   |
| 5 |   |   |   | 6 |   |   |   |   |   |   |   |
| 6 |   |   |   | 4 | 6 | 6 |   |   | 4 | 7 |   |

FIG. 3B is a diagram illustrating a frame structure in NR.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of a frequency band. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1.

TABLE 7

| μ | Δf = $2^{μ}*15$ [kHz] | Cyclic Prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (e.g., subcarrier spacings) to support various 5G services. For example, when a subcarrier spacing is 15 kHz, a wide area in traditional cellular bands is supported. When the subcarrier spacing is 30 kHz or 60 kHz, a dense-urban, lower latency, and wider carrier bandwidth are supported. When the subcarrier spacing is 60 kHz or higher, bandwidth greater than 24.25 GHz is supported to overcome phase noise.

An NR frequency band defines two types of frequency ranges FR1 and FR2. FR1 may represent a sub-6 GHz range, and FR2 may represent an above-6 GHz range as a millimeter wave (mmW).

Table 8 below shows definition of the NR frequency band.

TABLE 8

| Frequency Range designation | Corresponding Frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit, $T_s=1/(\Delta f_{max} \cdot N_f)$ where $\Delta f_{max}=480 \cdot 10^3$ and $N_f=4096$. DL and UL transmissions are organized into radio frames each having a duration of $T_f=(-f_{max}N_f/100)\cdot T_s=10$ ms. Each radio frame includes 10 subframes each having a duration of $T_{sf}=(\Delta f_{max}N_f/1000)\cdot T_s=1$ ms. In this case, there may exist one set of frames for UL and one set of frames for DL. Further, transmission of UL frame #i from the UE should state a time $T_{TA}=N_{TA}T_s$ before the start of a corresponding DL frame. For a numerology μ, slots are numbered with $n_s^{\mu} \in \{0, \ldots, N_{subframe}^{slots,\mu}-1\}$ in an increasing order in a subframe, and with $n_{s,f}^{\mu} \in \{0, \ldots, N_{frame}^{slots,\mu}-1\}$ in an increasing order in a radio frame. One slot includes Nμsymb consecutive OFDM symbols, and Nμsymb depends on a used numerology and slot configuration. The start of a slot $n_s^{\mu}$ in a subframe is aligned in time with the start of an OFDM symbol $n_s^\mu N_{symb}^\mu$ in the same subframe. All UEs are not capable of simultaneous transmission and reception, which implies that all OFDM symbols of a DL slot or a UL slot may not be used. Table 2 lists the number $N_{symb}^{slot}$ of symbols per slot, the number $N_{slot}^{frame,\mu}$ of slots per frame, and the number $N_{slot}^{subframe,\mu}$ of slots per subframe, for each SCS in a normal CP case, and Table 3 lists the number of symbols per slot, the number of slots per frame, and the number of slots per subframe, for each SCS in an extended CP case.

TABLE 9

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 10

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3B illustrates an example with μ=2, that is, an SCS of 60 kHz, in which referring to Table 2 one subframe may include four slots. One subframe={1, 2, 4} slots in FIG. 2 which is exemplary, and the number of slot(s) which may be included in one subframe is defined as listed in Table 2.

Further, a mini-slot may include 2, 4 or 7 symbols, fewer symbols than 2, or more symbols than 7.

In regard to physical resources in the NR system, an antenna port, a resource grid, a resource element, a resource block, a carrier part, etc. may be considered. Hereinafter, the above physical resources that may be considered in the NR system will be described in detail.

First, in regard to the antenna port, the antenna port is defined such that a channel on which a symbol on the antenna port is conveyed is derived from a channel on which another symbol on the same antenna port is conveyed. If large-scale properties of a channel on which a symbol on one antenna port is conveyed are capable of being derived from a channel on which a symbol on another antenna port, the two antenna ports may be said to be quasi co-located (QC) or to be in a quasi co-location (QCL) relationship. The large-scale properties include one or more of delay spread, Doppler spread, frequency shift, average received power, received timing, average delay, and spatial Rx parameters. The spatial Rx parameter represents a spatial (Rx) channel property parameter such as an angle of arrival.

FIG. 4A is a diagram illustrating an exemplary resource grid for the duration of a downlink slot used in 3GPP LTE/LTE-A system, which is an example of a wireless communication system;

Referring to FIG. 4A, a DL slot includes a plurality of OFDM symbols in a time domain. One DL slot includes 7 (or 6) OFDM symbols and a resource block may include 12 subcarriers in a frequency domain. Each element on a resource grid is called a resource element (RE). One RB includes 12×7 or 12×6 REs. The number NRB of RBs included in the DL slot depends on a DL transmission band.

A structure of a UL slot is identical to that of the DL slot but OFDM symbol is replaced by SC-FDMA symbol.

FIG. 4B illustrates a resource grid in the NR system.

Referring to FIG. 4B, a resource grid includes $N_{RB}^\mu N_{sc}^{RB}$ subcarriers in the time domain, and one subframe 14·2 μ OFDM symbols, which is exemplary and thus should not be construed as limiting the disclosure. In the NR system, a transmitted signal is described by one or more resource grids including $N_{RB}^\mu N_{sc}^{RB}$ subcarriers and $2^\mu N_{symb}^{(\mu)}$ OFDM symbols, where $N_{RB}^\mu \le N_{RB}^{max,\mu}$. $N_{RB}^{max,\mu}$ represents a maximum transmission bandwidth, which may be different for UL and DL as well as according to numerologies. In this case, one resource grid may be configured for each neurology μ and each antenna port p, as illustrated in FIG. 4. Each element of the resource grid for the numerology μ and the antenna port p is referred to as a resource element (RE), which is uniquely identified by an index pair (k,ℓ) where k=0, . . . , $N_{RB}^\mu N_{sc}^{RB}-1$ is a frequency-domain index and ℓ=0, . . . , $2^\mu N_{symb}^{(\mu)}-1$ indicates the position of a symbol in a subframe. An RE in a slot is indicated by an index pair (k,l) where l=0, . . . , $N_{symb}^\mu-1$. An RE(k,ℓ) for the numerology μ and the antenna port p corresponds to a complex value $a_{k,l}^{(p,\mu)}$. When there is no risk of confusion or a specific antenna port or a numerology is not specified, the indexes p and μ may be dropped, and as a result, the complex value may be $a_{k,l}^{(p)}$ or $a_{k,l}$. In addition, an RB is defined as $N_{sc}^{RB}=12$ consecutive subcarriers in the frequency domain.

In the NR system, a UE may be configured to operate in part of frequency bandwidth (hereinafter, a bandwidth part (BWP)) of a cell considering that the UE may not simultaneously support a wide bandwidth to be supported.

Resource blocks of the NR system include physical resource blocks defined within a BWP and common resource blocks numbered upward from 0 in the frequency domain for subcarrier spacing configuration μ.

A point A is acquired as follows.
  offsetToPointA for primary cell (PCell) DL represents a frequency offset between point A and the lowest subcarrier of the lowest resource block overlapping with a synchronization signal/physical broadcast channel (SS/PBCH) used by the UE for initial cell selection and is expressed in units of resource blocks assuming a subcarrier spacing of 15 kHz for FR1 and a subcarrier spacing of 60 kHz for FR2; and
  absoluteFrequencyPointA for all other cases represents the frequency location of point A expressed as in an absolute radio-frequency channel number (ARFCN).

The center of the subcarrier 0 of common resource block 0 for subcarrier spacing configuration μ coincides with the point A serving as a reference point for a resource grid. The relationship between a common resource block number nμCRB in the frequency domain and an RE (k, l) for subcarrier spacing configuration μ is given by the following equation.

$$n_{CRB}^\mu = \left\lfloor \frac{k}{N_{sc}^{RB}} \right\rfloor \quad \text{[Equation 1]}$$

where k is defined relative to point A such that k=0 corresponds to a subcarrier centered around point A. Physical resource blocks are numbered from 0 to $N^{size}_{BWP,i}-1$ within a BWP. Here, i is a BWP number. The relationship between the physical resource block nPRB in BWP i and the common resource block nCRB is given by Equation 2 below.

$$n_{CRB} = n_{PRB} + N_{BWP,i}^{start} \quad \text{[Equation 2]}$$

where $N^{start}_{BWP,i}$ is a common resource block in which a BWP starts relative to common resource block 0.

FIG. 5 is a diagram illustrating an exemplary structure of an downlink subframe used in 3GPP LTE/LTE-A system, which is an example of a wireless communication system;

Referring to FIG. 5, up to three(four) OFDM symbols at the start of the first slot in a downlink subframe are used for a control region to which control channels are allocated and the other OFDM symbols of the downlink subframe are used for a data region to which a PDSCH is allocated. Downlink control channels used in the LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission.

Control information transmitted on PDCCH is called DCI (downlink control information). Regarding DCI formats, Format 0 is defined for uplink and Format 1, Format 1A, Format 1B, Format 1C, Format 1D, Format 2, Format 2A, Format 3, Format 3A and the like are defined for downlink. Depending on usages, DCI format selectively includes such information as hopping flag, RB assignment, MCS (modulation coding scheme), RV (redundancy version), NDI (new data indicator), TPC (transmit power control), cyclic shift DM RS (demodulation reference signal), CQI (channel quality information) request, HARQ process number, TPMI (transmitted precoding matrix indicator), PMI (precoding matrix indicator) confirmation and the like.

PDCCH carries transmission format and resource allocation information of DL-SCH (downlink shared channel), transmission format and resource allocation information of UL-SCH (uplink shared channel), paging information on PCH (paging channel), system information on DL-SCH, resource allocation information of an upper-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment can monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIC (system information block)), CRC may be masked with SI-RNTI (system information-RNTI). And, if PDCCH is provided for a random access response, CRC may be masked with RA-RNTI (random access-RNTI).

FIG. 6 is a diagram illustrating an exemplary structure of a uplink subframe used in 3GPP LTE/LTE-A system, which is an example of a wireless communication system.

Referring to FIG. 6, a UL subframe includes a plurality of slots (e.g., 2 slots). Each of the slots can include SC-FDMA symbols of which number varies in accordance with a CP length. The UL subframe is divided into a data region and a control region in a frequency domain. The data region includes PUSCH and is used to transmit such a data signal as audio and the like. The control region includes PUCCH and is used to transmit uplink control information (UCI). The PUCCH includes an RB pair situated at both end portions of the data region on a frequency axis and hops using a slot as a boundary.

PUCCH can be used to transmit the following control information.

- SR (scheduling request): this is information used to request an uplink UL-SCH resource. This is transmitted by OOK (on-off keying).
- HARQ ACK/NACK: This is a response signal for a DL data packet on PDSCH. This indicates whether the DL data packet is successfully received. In response to a single DL codeword, 1-bit ACK/NACK is transmitted. In response to two DL codewords, 2-bit ACK-NACK is transmitted.
- CQI (channel quality indicator): This is the feedback information on a DL channel. MIMO (multiple input multiple output) related feedback information includes RI (rank indicator), PMI (precoding matrix indicator), PTI (precoding type indicator) and the like. 20 bits are used per subframe.

A size of control information (UCI) transmittable in a subframe by a user equipment depends on the number of SC-FDMAs available for a control information transmission. The SC-FDMA available for the control information transmission means SC-FDMA symbol remaining after excluding SC-FDMA symbol for a reference signal transmission from a subframe. In case of an SRS (sounding reference signal) configured subframe, a last SC-FDMA symbol of the subframe is excluded as well. A reference signal is used for coherent detection of PUCCH. And, the PUCCH supports 7 formats depending on transmitted informations.

Since an FDR transceiving system capable of transmitting and receiving a UL signal and a DL signal on the same frequency band simultaneously can double frequency efficiency (spectral efficiency) to the maximum in comparison with an existing system that transmits and receives a UL signal and a DL signal by dividing frequency or time, it is getting the spotlight as one of the core technologies of the next generation 5G mobile communication system.

FDR using a single frequency transmission band can be defined as a transmission resource configuration scheme of simultaneously performing transmission and reception through a single frequency transmission band in aspect of a random wireless device. As one special example of this, it can be represented as a transmission resource configuration scheme of simultaneously performing 'DL transmission and UL reception of a base station' and 'DL reception and UL transmission of a wireless UE' through a single frequency transmission band regarding the wireless communication between a general base station (or, relay, relay node, Remote Radio Head (RRH), etc.) and a wireless UE. As another example, it can be represented as a transmission resource configuration scheme of simultaneously performing transmissions and receptions between wireless UEs on the same frequency transmission band in a situation of device-to-device direct communication (D2D) between wireless UEs. Although proposed technologies related to FDR are described in this disclosure by exampling a case of wireless transmission/reception between a general base station and a wireless UE, the present invention includes a case of a network wireless device performing wireless transmission/reception with a UE as well as a general base station and also includes a case of direct communication between UEs.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of devices (in the case where FDR is applied to a mobile communication system (BW=20 MHz)) may be determined as illustrated in Table 11 below.

TABLE 11

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 11, it may be noted that to effectively operate the FUR system in a 20-MHz BW, a UE needs 119-dBm self-IC performance. A thermal noise value may be changed to $N_{0,BW}=-174$ dBm+10×$\log_{10}$(BW) according to the BW of a mobile communication system. In [Table 11], the thermal noise value is calculated on the assumption of a 20-MHz BW. In relation to [Table 11], for receiver noise figure (NF), a worst case is considered referring to the 3GPP specification requirements. Receiver thermal noise level is determined to be the sum of a thermal noise value and a receiver NF in a specific BW.

Types of self-IC Schemes and Methods for Applying the Self-IC Schemes

FIG. 8 is a diagram illustrating positions at which three self-IC schemes are applied, in a radio frequency (RF) Tx and Rx end (or an RF front end) of a device. Now, a brief description will be given of the three self-IC schemes.

Antenna Self-IC: Antenna self-IC is a self-IC scheme that should be performed first of all self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an analog-to-digital convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital self-IC. However, since digital self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital self-IC.

FIG. 9 is a block diagram of a self-IC device in a proposed communication apparatus in an OFDM communication environment based on FIG. 8.

While FIG. 9 shows that digital self-IC is performed using digital SI information before Digital to Analog Conversion (DAC) and after ADC, it may be performed using a digital SI signal after inverse fast Fourier transform (IFFT) and before fast Fourier transform (FFT). Further, although FIG. 9 is a conceptual diagram of self-IC though separation of a Tx antenna from an Rx antenna, if antenna self-IC is performed using a single antenna, the antenna may be configured in a different manner from in FIG. 5.

3GPP LTE system operates based on fixed UL and DL bands for which both TDD and FDD are determined in advance like Table 8. In case of TDD, TDD configuration can be determined cell-specifically. Yet, in case of FDD, determined UL and DL bands are located on different frequency bands, respectively. Since one band is determined to be utilized for the usage of either UE transmission or base station transmission, transmission on other bands cannot be performed. Table 12 shows E-UTRA frequency bands.

TABLE 12

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |

TABLE 12-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 24 | 1626.5 MHz-1660.5 MHz | 1525 MHz-1559 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

Note
[1]Band 6 is not applicable.

Yet, an actual data situation of a UE has the characteristic of asymmetric data traffic. In most of communication environments, DL data traffic is heavier than UL data traffic. And, a traffic amount of about 1:9 between UL and DL has been reported. In such an asymmetric data traffic situation, in case of operating by FDD-LTE on the basis of frequency assignment for the fixed UL and DL transmissions like Table 8, resource utilization may be lowered. To solve such a problem, Flexible FDD wireless transmission scheme was proposed as an early stage of the FDR system.

Flexible FDD system is the technology intending to raise resource use efficiency in accordance with a traffic situation of a UE in a manner of utilizing a UL band as a DL band for a specific time based on a fact that an operation of FDD system is deregulated according to the actual asymmetric data traffic characteristic. The resource use efficiency comparison between the existing FDD-LTE and the flexible FDD wireless transmission scheme is shown in FIG. 10.

FIG. 10 is a diagram showing the resource use efficiency comparison between the existing FDD-LTE and the flexible FDD wireless transmission scheme (Symmetric traffic situation and heavy DL data traffic situation).

Referring to FIG. 10, as DL and UL resources are mostly used in a symmetric data traffic situation, resource efficiency is high. Yet, in a heavy DL data traffic situation, as resources are not used in case of FDD (FDD-LTE) in an existing LTE system, FIG. 10 clearly shows that frequency resource is wasted. Thus, in order to solve the problem that resource use efficiency is lowered, by utilizing a UL frequency resource as a frequency resource for DL transmission at a specific time, resource efficiency can be raised in a heavy DL data traffic situation. This is shown in detail in FIG. 11 together with a buffer status to transmit in a flexible FDD wireless transmission scheme.

FIG. 11 is a diagram showing resource utilization in flexible FDD.

Compared to a resource use in case of a symmetric traffic situation, resource efficiency can be raised in a heavy DL traffic situation by utilizing a UL frequency resource as a DL resource for a DL transmission at a specific time.

Referring to FIG. 11, a flexible FDD wireless transmission scheme means a scheme of flexibly configuring a DL frequency resource and a UL frequency resource to be suitable for each service or application program. In this case, a time resource may be configured by a unit such as a time slot configured with one or more transmission symbols, a subframe, a frame or the like. Through this, a wireless transmission resource allocation optimized for a service or application characteristic of an individual wireless UE unit can be supported and the overall frequency use efficiency on the random base station coverage can be advantageously increased as well.

FIG. 12 is a diagram for explaining relation between IMT 2020 core performance requirements for 5G and 5G performance requirements for each service scenario.

FIG. 12 illustrates the relation between the core performance requirements for 5G, which are proposed in IMT 2020, and the 5G performance requirements for each service scenario.

In particular, uMTC services have extremely restricted Over-The-Air (OTA) latency requirements and requires high mobility and reliability (OTA Latency: <1 ms, Mobility: >500 km/h, and BLER: <$10^{-6}$).

FIG. 13 is a diagram showing the LTE/LTE-A frame structure.

FIG. 13 shows the basic concept of the frame structure of LTE/LTE-A. One fame amounts to 10 ms and includes 10 subframes of 1 ms. One subframe includes 2 slots of 0.5 ms, and one slot includes 7 OFDM (Orthogonal Frequency Division Multiplexing) symbols. One Resource Block (RB) is defined with 12 subcarriers in interval of 15 kHz and 7 OFDM symbols. On the center frequency 6 RBs, a base station transmits Primary Synchronization Signal (PSS) for synchronization, Secondary Synchronization Signal (SSS), and Physical Broadcast Channel (PBCH) for system information. Here, according to Normal/Extended CP (Cyclic Prefix), TDD (Time Division Duplex)/FDD (Frequency Division Duplex), the frame structure, a signal and a channel positions may vary.

FIG. 14a is a diagram showing an example of FDD/TDD frame structure in LTE/LTE-A system.

Referring to FIG. 14a, in case of an FDD frame structure, DL and UL frequency bands are distinct from each other. In case of a TDD frame structure, a DL region and a UL region are distinct from each other within the same band in unit of a subframe.

FIG. 14b is a diagram illustrating examples of cross-link interference of a time division multiplexing (TDM)-based flexible duplex operation in a paired spectrum and in an unpaired spectrum.

Interference that should be additionally considered in operating flexible duplex is cross-link interference. More specifically, if an adjacent BS generates a DL signal while a specific BS receives a UL signal, the DL signal of the adjacent BS serves as interference due to DL/UL operations of different directions. In addition, if an adjacent UE generates a UL signal while a specific UE receives a DL signal, the UL signal of the adjacent UE serves as interference. Such interference may be illustrated as in FIG. 14b according to a paired spectrum and an unpaired spectrum.

FIG. 15 is a diagram showing an example of a self-contained subframe structure.

FIG. 15 shows a self-contained subframe structure to meet a low delay requirement among 5G performance requirements. Regarding a TDD based self-contained subframe structure, resource intervals (e.g., DL control channel and a UL control channel) for DL and UL exits within a single subframe. And, a Guard Period (GP) for solving a problem of interference between DL and UL and a resource interval exist as well.

FIG. 15 (*a*) shows one example of a self-contained subframe structure. A subframe is configured in order of resource intervals for DL-UL-data and each GP exists between the resource intervals. In FIG. 15 (*a*), a DL resource interval denoted by DL may be a resource interval for a DL control channel and a UL resource interval denoted by UL may be a resource interval for a UL control channel.

FIG. 15 (*b*) shows one example of a self-contained subframe structure. A subframe is configured in order of resource intervals for DL-data-UL and a GP exists in front of the UL resource interval only. Likewise, in FIG. 15 (*b*), a DL resource interval denoted by DL may be a resource interval for a DL control channel and a UL resource interval denoted by UL may be a resource interval for a UL control channel.

Hereinafter, methods of effectively applying a flexible duplex wireless transmission scheme to wireless transmission between the UE and the eNB will be proposed. The eNB expressed throughout the present invention includes a relay, a relay node, a remote radio head (RRH), and the like. The present invention also proposes examples of designing a reference signal (RS) for measuring cross-link interference generated in a flexible duplex wireless transmission scheme and performing signaling supporting such design.

The present invention explains the proposals and then describes the detailed embodiments of the proposals. The proposals and the embodiments of the proposals may be usable in a manner of being coupled or combined together. In the present invention, the crosslink interference means interference generated from a case that an interference-receiving subject is different from an interference-giving subject at a corresponding timing. For example, when the interference-receiving subject is at a DL reception timing and the interference-giving subject is at a UL transmission timing, interference generated from a UL transmission can be called crosslink interference. In the present invention, a UE/base station in position of receiving interference due to crosslink interference shall be represented as a victim UE/TRP and a UE/base station in position of giving interference shall be represented as an aggressor UE/TRP.

An example of cross-link interference in terms of the eNB will be described hereinbelow.

FIG. 16 is a diagram illustrating an example of a received signal and cross-link interference in a victim TRP (e.g., eNB).

FIG. 16 illustrates interference caused by DL transmission of a neighbor TRP during UL reception of a TRP in a TDD-based self-contained frame structure. For convenience of description, it is assumed in FIG. 16 that an aggressor TRP and a victim TRP have the same numerology and the same frame structure. Cross-link interference in FIG. 16 may be illustrated as in, for example, FIG. 17 in terms of the UE.

FIG. 17 is a diagram illustrating an example of a received signal and cross-link interference in a victim UE.

As illustrated in FIG. 17, there may be an RS added for a DL signal and an RS added for a UL signal. FIG. 17 illustrates an example in which the RS added for the DL signal and the RS added for the UL signal are located at the same position. Unlike the example of FIG. 17, the RS added for the DL signal and the RS added for the UL signal may be located at different positions.

When a specific TRP changes a DL/UL configuration for flexible duplex, cross-link interference occurs and UL reception performance of the TRP or DL reception performance of the UE may be degraded due to additional interference. Accordingly, a receiver capable of suppressing or cancelling cross-link interference is needed. However, it is necessary to estimate orthogonality (channel gain) caused by cross-link interference in order to operate the receiver. To this end, detailed proposals are given as described below.

To estimate orthogonality of a cross-link interference signal from an adjacent aggressor TRP/UE or obtain interference information, a reference signal is usable.

To suppress or mitigate cross-link interference, channel estimation of cross-link interference is necessary. In a receiving position of a victim TRP, cross-link interference from an aggressor TRP may occur in UL reception. In addition, in a receiving position of a victim UE, cross-link interference from the aggressor UE may occur in DL reception. Therefore, a utilization range of a reference signal may vary depending on a frame structure of UL and a frame structure of DL.

Already, in cellular communication, a DM-RS signal exists for the following purposes.

DM-RS for DL: Reference signal for DL control and demodulation of a DL data signal DM-RS for UL: Reference signal for UL control and demodulation of a UL data signal Currently, NR considers a case that a reference signal of DL/UL is designed commonly. Yet, since an RS of DL UL may be designed commonly or not, two cases for this are described in the following.

Specifically, in case that an RS of DL/UL uses a common design (i.e., a case that positions of time and frequency are identical), DL and UL can be distinguished from each other using different frequency resources or different time or code resources.

FIG. 18 is a diagram illustrating an example when a DL RS and a UL RS have common design.

When the DL RS and UL RS have common design, frequency and time locations of the DL RS and the UL RS may be equal. In this situation, the DL RS and the UL RS may be distinguished by making the DL RS and the UL RS orthogonal through allocation of a resource such as a frequency resource, a time resource, or a code resource. Embodiment 1 described below is an embodiment capable of obtaining orthogonality between the DL RS and the UL RS using the frequency resource, the time resource, or the code resource.

Transmission Timing Adjustments

A UE may start a UL frame transmission from a boundary of a DL frame of a reference cell before a time of $(N_{TA} + N_{TA\_offset})*T_c$. Here, $N_{TA}$ is a Timing Advanced (TA) value, $N_{TA\_offset}$ is a TA offset value, and $T_c$ indicates a default timing unit.

If a UE is provided with a TA offset value through a higher layer, the UE may use the provided TA offset value as $N_{TA\_offset}$. If the UE is not provided with the TA offset value, the UE may use a default TA offset value as $N_{TA\_offset}$.

If two UL carriers are configured for a UE, the same $N_{TA\_offset}$ is applicable to the two UL carriers.

IF a UE receives a timing advance command $T_A$ for a Timing Advance Group (TAG), the UE may adjust UL transmission timings of PUSCH/SRS/PUSCH and the like for all serving cells included in the TAG based on $N_{TA\_offset}$. In other words, the same $T_A$ and the same $N_{TA\_offset}$ are applicable to all serving cells included in the TAG.

In some implementations, $T_A$ for TAG indicates a relative difference between a current UL timing and a changed UL timing by a multiple of $16*64*T_c/2^u$. Here, $2^U$ may be determined according to a subcarrier spacing.

For example, in case of a Random Access Response (RAR), values of $N_{TA}$ may be indicated via an index value of $T_A$. Specifically, '$N_{TA}=T_A*16*64/2^u$' is determined, and after reception of an RAR via $N_{TA}$, a first UL transmission timing may be indicated from a UE.

In cases other than an RAR, $T_A$ may indicate values of $N_{TA}$ via an index value of $T_A$. In this case, it may be determined as $N_{TA\_new}=N_{TA\_old}+(T_A-31)*16*64/2^u$. Here, $N_{TA\_old}$ may be a current $N_{TA}$ value, and $N_{TA\_new}$ may be an $N_{TA}$ value to be newly applied.

If an active UL BWP is changed between a time when adjustment for a UL transmission timing is applied and a time when $T_A$ is received, a UE may determine a $T_A$ value based on a subcarrier spacing of a new active UL BWP. If an active UL BEP is changed after a UL transmission timing has been adjusted, the UE may assume that absolute $T_A$ values before and after the active UL BWP change are equal to each other.

Sounding Reference Signal (SRS) Power Control

A UE may equally distribute power to antenna ports configured for SRS transmission. When the UE transmits an SRS via an active UL BWP of a carrier f of a serving cell c using an SRS power control adjustment status index 1, an SRS transmission power on an SRS transmission occasion i may be determined as Equation 3 in the following.

$$P_{SRS,b,f,c}(i, q_s, l) = \min\left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\}$$ [Equation 3]

Here, $P_{CMAX,f,c}(i)$ means a maximum power that can be outputted by the UE via the carrier f of the serving cell c on the SRS transmission occasion i. PO_SRS,b,f,c (qs) may be obtained based on an SRS resource set qs and p0 for the active UL BWP b.

$M_{SRS,b,f,c}(i)$ may mean an SRS bandwidth expressed by the number of resource blocks for an SRS transmission occasion i in an active BWP b. $\alpha_{SRS,b,f,c}(q_s)$ may be obtained via an SRS resource set $q_s$ and alpha for an active UL BWP b. $PL_{b,f,c}(q_d)$ is an estimated dB value of DL path loss. Here, the estimated dB value of the pathloss may be calculated using an RS resource index qd for an active DL BWP of a serving cell and an SRS resource set qs. In addition, the RS resource index qd is provided by a higher layer parameter 'pathlossReferenceRS' associated with the SRS resource set qs, and the UE may obtain an SS/{BCH block index or a CSI-RS resource index via 'pathlossReferenceRS'. If 'pathlossReferenceRS' is not received, the UE may obtain $PL_{b,f,c}(q_d)$ by using the SS/PBCH block index obtained via Master Information Block (MIB) as an RS resource.

It may be expressed as $$h_{b,f,c}(i) = h_{b,f,c}(i - i_0) + \sum_{m=0}^{C(S_i)-1} \delta_{SRS,b,f,c}(m),$$

and a $\delta_{SRS,b,f,c}$ value may be determined using a preconfigured table. In addition, $\delta_{SRS,b,f,c}(m)$ may be jointly coded with another a Transmit Power Control (TPC) command included in DCI format 2_3, and $$\sum_{m=0}^{C(S_i)-1} \delta_{SRS,b,f,c}(m)$$

may be determined based on a sum of TPC command values included in a specific TPC command set.

Proposal 1

In order to improve accuracy of a CLI measurement result in case of SRS transmission of a UE for UE-to-UE CLI measurement, a transmission power of an SRS can be adjusted.

As described above, in case of performing Reference Signal Received Power (RSRP) or Received Signal Strength Indicator (RSSI) based CLI measurement, a BS may configure a transmission power for a UE to adjust an SRS transmission power in UL, and this SRS transmission power information may be inserted as one parameter in SRS configuration exchanged with an adjacent BS.

A method of measuring cross-link interference by a UE according to the present disclosure may include receiving SRS configuration information from a BS and transmitting an SRS based on the SRS configuration information.

The SRS configuration (SRS config) information may include information on SRS resource sets, first SRS resource set identifiers corresponding to the SRS resource sets, respectively, information on SRS resources, and SRS resource identifiers corresponding to the SRS resources, respectively.

Each of the SRS resource sets may include at least one of a second SRS resource set identifier, identifiers of SRS resources respectively included in the SRS resource sets, a first resource type, a usage, an alpha, a power, a pathloss reference RS, or an SRS power control adjustment state value.

The path loss reference RS may include at least one of a synchronization signal block index (ssb-index) or a channel state information reference signal (csi-rs-index).

The SRS power control adjustment state value may indicate that an SRS transmission power is configured equal to a PUSCH transmission power.

The SRS power control adjustment state value may indicate that an SRS transmission power is configured per SRS resource set.

If the SRS power control adjustment state value indicates that the SRS transmission power is configured per SRS resource set, the same SRS transmission power may be configured for all SRS resource sets.

The first resource type may indicate one of aperiodic SRS configuration, semi-persistent SRS configuration and periodic SRS configuration.

The usage may indicate one of beam management usage, codebook usage, non-codebook usage, and antenna switching usage.

The usage may indicate one of beam management usage, codebook usage, non-codebook usage, antenna switching usage and UE-to-UE interference measurement usage.

Each of the SRS resources may include at least one of an SRS resource identifier, the number of SRS ports, a Phase Tracking Reference Signal (PTRS) port index, a transmission comb, resource mapping information, a frequency domain location, a frequency domain shift value, frequency hopping information, information indicating whether to be group hopping or sequence hopping, a resource type, a sequence identifier, or spatial relationship information.

The PTRS port index may be provided for an SRS resource for non-codebook based UL MIMO. This may be useful if a corresponding PTRS UL configuration is configured as CP-OFDM. The PTRS port index may be smaller than the maximum number of ports of the PTRS UL configuration.

It may be unnecessary to exchange the SRS configuration information. Namely, if an SRS transmission power for CLI measurement is configured equal to a transmission power of PUSCH, SRS configuration information may not be exchanged between different base stations. In order for a UE to configure an SRS transmission by being coupled with transmission power information of PUSCH, a power related parameter 'parameter srs-pcadjustment-state-config' in SRS configuration may be configured for the UE as a same power control adjustment option value, which may configure the power control adjustment in SRS to the same value ($h_{f,c}(i, l) = f_{f,c}(i,l)$) as the power control adjustment in PUSCH.

For the accurate measurement, an SRS transmission (TX) power for CLI measurement may be configured as a fixed power for all UEs.

This is to reduce effect of a specific UE that makes a transmission with a strong power at a specific timing point in measurement because a measurement timing point is different from a reporting timing point. To this end, after a different power control adjustment option value has been set for srs-pcadjustment-state-config, a corresponding power value (e.g., a max power value of a UE, a max or min value for interference measurement, etc.) may be configured in advance via RRC or PDCCH.

Proposal 2

In case of performing (a)periodic UE-to-UE CLI measurement using the aforementioned IMR or SRS, CLI measurement may be implicitly/explicitly notified to a UE in a specific situation for a cell edge user possibly receiving considerably interference instead of making a request for CLI measurement to all UEs in a corresponding serving cell.

As describe above, in case of measuring UE-to-UE CLI periodically or aperiodically, this CLI measurement result may have no gain in a specific situation in CLI management aspect. Rather, in case that a UE reports an incorrect CLI measurement result to a BS, it becomes incorrect CLI measurement (e.g., resource allocation) to reduce performance probably. Therefore, in case of a UE that satisfies a specific condition (e.g., a case of a UE moving fast, a case of a UE located at the center of a cell, a case of a UE necessary to reduce power consumption), a BS may explicitly configure CLI_measurement_disable for the corresponding UE in order not to perform (a)periodic UE-to-UE measurement and a measurement reporting. In addition, based on Channel Quality Indicator (CQI) reporting transmitted by a UE to a serving cell, if it is determined that the UE is located at the cell center, the UE may not make measurement and reporting. On the contrary, based on CQI reporting transmitted by a UE to a serving cell, if it is determined that the UE is located at a cell edge, the UE may make (a)periodic UE-to-UE CLI measurement and measurement reporting.

According to the present disclosure, in a wireless communication system, a method of transmitting an SRS by a User Equipment (UE) may include transmitting a Channel State Information (CSI) report including a Channel Quality Indicator (CQI) to a base station, receiving a first configuration information including an information on a location of the UE in a cell of the base station from the base station, receiving a second configuration information including an SRS configuration from the base station, and transmitting the SRS based on the first configuration information and the second configuration information.

If the information on the location of the UE indicates that the UE is located at a center of the cell of the base station, the SRS may not be transmitted.

If the information on the location of the UE indicates that the UE is located at an edge of the cell of the base station, the SRS may be transmitted.

According to the present disclosure, in a wireless communication system, a method of receiving an SRS by a Base Station (BS) may include receiving a Channel State Information (CSI) report including a Channel Quality Indicator (CQI) from a User Equipment (UE), transmitting a first configuration information including an information on a location of the UE in a cell of the BS to the UE, transmitting a second configuration information including an SRS configuration to the UE, and receiving the SRS from the UE. The SRS may be generated based on the first configuration information and the second configuration information.

The SRS configuration (SRS config) information may include information on SRS resource sets, first SRS resource set identifiers corresponding to the SRS resource sets, respectively, information on SRS resources, and SRS resource identifiers corresponding to the SRS resources, respectively.

Each of the SRS resource sets may include at least one of a second SRS resource set identifier, identifiers of SRS resources respectively included in the SRS resource sets, a first resource type, a usage, an alpha, a power, a path loss reference RS, or an SRS power control adjustment state value.

The path loss reference RS may include at least one of a synchronization signal block index (ssb-index) or a channel state information reference signal (csi-rs-index).

The SRS power control adjustment state value may indicate that an SRS transmission power is configured equal to a PUSCH transmission power.

The SRS power control adjustment state value may indicate that an SRS transmission power is configured per SRS resource set.

If the SRS power control adjustment state value indicates that the SRS transmission power is configured per SRS resource set, the same SRS transmission power may be configured for all SRS resource sets.

The first resource type may indicate one of aperiodic SRS configuration, semi-persistent SRS configuration and periodic SRS configuration.

The usage may indicate one of beam management usage, codebook usage, non-codebook usage, and antenna switching usage.

The usage may indicate one of beam management usage, codebook usage, non-codebook usage, antenna switching usage and UE-to-UE interference measurement usage.

Each of the SRS resources may include at least one of an SRS resource identifier, the number of SRS ports, a Phase Tracking Reference Signal (PTRS) port index, a transmission comb, resource mapping information, a frequency domain location, a frequency domain shift value, frequency hopping information, information indicating whether to be group hopping or sequence hopping, a resource type, a sequence identifier, or spatial relationship information.

The PTRS port index may be provided for an SRS resource for non-codebook based UL MIMO. This may be useful if a corresponding PTRS UL configuration is set as CP-OFDM. The PTRS port index may be smaller than the maximum number of ports of the PTRS UL configuration.
Proposal 3

In case of details of Interference Measurement Resource (IMR) configuration, it is good to use the existing functions in general if possible. Particularly, since CLI-RSSI may not be measured by all UEs, and more particularly, by Rel-15 UEs, IMR resources configured for some UEs may need to be 'rate-matched' for PDSCH transmission of another UE. Rel-15 may support two kinds of rate matching patterns, i.e., (1) rate matching patterns for CSI-RS/CSI-IM and (2) RB/symbol-level rate matching patterns. When a UE measures RSSI on resources used for SRS transmission, RB/symbol-level IMR patterns may be more appropriate. If CSI-RS is not used for CLI measurement, an RB/symbol-level rate matching pattern and an IMR pattern may be more appropriate. In order to configure an IMR pattern as a starting point, it may be able to consider reusing an existing RB/symbol-level rate matching pattern. The IMR configuration may be established using the SRS configuration.

Since the transmission time of the UE is aligned with the timing of the BS when a signal arrives at the BS, the timing may be misaligned during the UE-to-UE CLI measurement between a UE having a different distance from the UE. In order to address this issue, proposals disclosed below may be used.

That is, the uplink timing configured by the BS is applied as the timing of the PUSCH of the UE. The uplink timing may be determined by an uplink timing advance $N_{TA}$ and an uplink timing advance offset $N_{TA,offset}$. In general, the UE may determine the uplink timing by receive a timing advance command (TAC) using a message of Layer 2 to. However, when a first UE receives an SRS for UE-to-UE CLI from a second UE, there is a need for a method for adjusting the timing between the first UE and the second UE because the SRS for the UE-to-UE CLI is independent of the timing adjustment between the UE and the BS.
Proposal 4

For RSRP (or RSSI)-based UE-to-UE CLI measurement, the transmission timing of the SRS may be changed. To this end, the BS may implicitly/explicitly configure the information in the following proposals for the UE.

The UE-to-UE CLI may be measured based on the SRS configuration for UE-to-UE CLI measurement, in place of the existing uplink timing configuration.

Since the BS may know both information about the first UE that transmits the SRS for UE-to-UE CLI measurement and the second UE that measures the UE-to-UE CLI, configuration information about the SRS to be transmitted may be explicitly informed to the first UE, and configuration information about the SRS to be received may be explicitly informed to the second UE. The BS may implicitly inform the first UE and the second UE of each of the configuration information about the SRS to be transmitted and the configuration information about the SRS to be received.

Each of the configuration information about the SRS to be transmitted and the configuration information about the SRS to be received may include timing advance information about the SRS.

The SRS timing advance information may include SRS timing advance information ($N_{TA,SRS}$) and SRS timing advance offset information ($N_{TA,offset,SRS}$).

The timing of the SRS may be generated based on the SRS timing advance information and the SRS timing advance offset information.

The timing of a general PUSCH may be determined by the following equation.

$$(N_{TA}+N_{TA\_offset})*T_c \qquad \text{[Equation 4]}$$

The UE may start transmitting an uplink frame at the boundary of a downlink frame of a reference cell before the time of Equation 4. Here, $N_{TA}$ is a timing advanced (TA) value, $N_{TA\_offset}$ is a TA offset value, and $T_c$ denotes a basic timing unit.

That is, the SRS transmission timing may be determined using $N_{TA,SRS}$ instead of $N_{TA}$ and $N_{TA,offset,SRS}$ instead of $N_{TA\_offset}$.

Alternatively, $N_{TA}$ may be used, and $N_{TA,offset,SRS}$ may be used instead of $N_{TA\_offset}$.

The SRS timing advance information ($N_{TA,SRS}$) and the SRS timing advance offset information ($N_{TA,offset,SRS}$) may be configured for each SRS resource set in the SRS configuration. That is, each of the SRS resource sets included in the SRS configuration may include the SRS timing advance information ($N_{TA,SRS}$) and the SRS timing advance offset information ($N_{TA,offset,SRS}$).

Since changing the SRS timing is intended for UE-to-UE CLI measurement, the SRS timing may be different from the timing of the PUSCH transmitted to the BS. Therefore, simultaneous transmission of the SRS and the PUSCH in one symbol should be prevented.

In addition, the position at which the SRS is transmitted may be limited. For example, the SRS may be configured to be transmitted in a maximum of 4 consecutive symbols within the last 6 symbols in one slot (which may include 14 symbols). The position(s) at which the SRS is transmitted may be configured for each SRS resource. The SRS may be repeatedly transmitted twice or more times at the same position(s) in another slot. The above-mentioned "position" may mean a singular expression (a position, i.e., one symbol), or may mean a plural expression (positions, i.e., a plurality of symbols).

As described above, when the UE transmits PUSCH/PUCCH/SRS, the UE applies TA in consideration of the reception timing of the BS. The following detailed proposals may be applied to change (delay) the transmission timing of the SRS from the perspective of a transmitting UE such that the signal may reach within the CP at DL timing of the receiving UE.
Proposal 4-1

DL receiving timing+fixed offset (inclusive of zero): Ignoring the TA value previously applied to the UE, the BS may configure information for transmission of SRS applying the changed TA value based on the reference timing of the UE (or DL receiving timing of the receiving UE) for the UE. That is, the changed TA value is a specific calculated value (or a predefined fixed offset value or zero). To this end, in SRS configuration, the BS may determine a specific calculated value (or a predefined fixed offset value or zero) as the TA value and explicitly inform the same to the UE. Then, when the UE can implicitly know from the SRS configuration that the SRS transmission is for UE-to-UE CLI measurement (e.g., a specific time position of the SRS in Proposal 10, a specific beam value of the SRS in Proposal 9, or a predefined sequence value), the UE may transmit the SRS with a predetermined changed TA value. To this end, the BS may configure a predetermined TA value for the UE.

Since the SRS for UE-to-UE CLI measurement should be transmitted within the CP of the downlink timing of the receiving UE, the transmitting UE may receive the downlink timing information of the receiving UE from the BS, and transmit the SRS based on the downlink timing information of the receiving UE. The downlink timing of the receiving UE may be indicated by a TA value, and an offset value according to the distance between the receiving UE and the transmitting UE may be indicated by a TA offset value.

The BS may receive CSI including CQI, RI, PMI and CRI from the UE. Based on the CQI received from the UE, it may acquire information on whether the UE is positioned at a cell center or a cell edge of the BS. The BS may know the exact position of the UE based on a position reference signal (PRS).

When the BS obtains position information about a plurality of UEs, it may appropriately transmit configuration information related to SRS transmission timing to each of the receiving UE that measures the UE-to-UE CLI and the transmitting UEs that transmits the SRS for UE-to-UE CLI measurement, respectively, based on the position information about the plurality of UEs.

Proposal 4-2

Constant negative offset (TA+fixed offset): Information for transmitting SRS may be configured for the UE by applying the offset value with respect to the existing TA value of the UE, ignoring the TA value previously applied to the UE. That is, the BS may determine the changed TA value based on the TA value that the UE has and a specific calculated offset value (or a predefined fixed offset value or zero), and explicitly indicate the same to the UE. To this end, the BS may determine an SRS configuration as a specific calculated offset value (or a predefined fixed offset value or zero) and explicitly indicate the same to the UE. Then, when the UE can implicitly know from the SRS configuration that the SRS transmission is for UE-to-UE CLI measurement (e.g., a specific time position of the SRS in Proposal 9, a specific beam value of the SRS in Proposal 8, or a predefined sequence value), the UE may transmit the SRS with a predetermined changed TA value. To this end, the BS may configure a predetermined TA value for the UE.

In order to transmit the SRS for UE-to-UE CLI measurement, the transmission timing of the SRS may be determined based on the existing TA value $N_{TA}$ and the offset value $N_{TA,offset,SRS}$.

Since the existing TA value $N_{TA}$ is used, an exchange of configuration information may be small. On the other hand, the range of the offset value may be wider. In order to maintain the range of the offset value within a certain level, the method of Proposal 4-2 may be used only for UEs positioned at the cell center (i.e., UEs positioned within a certain distance from the center point of the cell).

Proposal 5

The UE may transmit the SRS by determining the timing of SRS transmission based on the changed TA value or fixed offset value information configured by the BS in Proposal 4.

The transmitting UE may receive configuration information about the SRS for UE-to-UE CLI measurement from the BS, determine the timing of the SRS based on the configuration information, and transmit the SRS based on the determined timing. The configuration information may include at least one of a TA value or a TA offset value of the SRS.

Proposal 5-1

When SRS transmission for CLI measurement is configured in the last symbol of a slot, it may be performed using a guard time (e.g., 682*$T_s$) period that is present between a slot including an UL slot and a slot including the next DL.

When the last symbol of the slot is for UL and the first symbol of the next slot is for DL, the SRS may be transmitted in a guard period present between the slots.

In general, the timing of the UL symbol precedes the timing of the DL symbol. Accordingly, when a DL symbol is positioned after a UL symbol, there may be more room for scheduling. In addition, since the operation may be performed using the guard period between slots, transmitting the SRS in the last symbol of the slot may not affect the next symbol.

Proposal 5-2

When SRS for CLI measurement is transmitted at a position other than the last symbol of the slot, it may overlap with the next symbol of the SRS. Accordingly, rate matching may be performed after puncturing the portion overlapping with the next symbol.

When the SRS is transmitted at a position other than the last symbol of the slot, it may overlap with the next symbol in terms of time. Accordingly, in order not to affect the next symbol, the portion of the SRS overlapping with the next symbol may be punctured and rate matching may be performed.

Proposal 6

For RSRP (or RSSI)-based UE-to-UE CLI measurement, the timing of a measurement window may be changed. To this end, the BS may implicitly/explicitly configure the information in the following proposals for the receiving UE.

As described above, When PUSCH/PUCCH/SRS is transmitted, the transmitting UE applies TA in consideration of the reception timing of the BS. Accordingly, in order to transmit the SRS signal transmitted by the receiving UE within the CP, the timing of the measurement window may be changed (advanced) according to the following detailed proposals.

Proposal 6-1

Maximum TA or Constant negative offset (maximum TA+fixed offset) or fixed offset or zero:

In general, severe interference occurs between UEs when the distance between UEs is short. Accordingly, the SRS transmitted from the UE may be received with the TA value of the UE applied thereto. In addition, the UE may be positioned at the cell edge, and accordingly the TA value may large. In this regard, the BS may configure, for the UE, the TA value to be applied to the measurement window.

That is, since the TA value is determined according to the position of the transmitting UE, and the SRS is transmitted based on the determined TA value, the BS may transmit a configuration according to the determined TA value to the receiving UE.

That is, the BS may configure a TA value to be applied to the measurement window and transmit configuration information related to the TA value to the receiving UE. The configuration information related to the TA value may include information about timing of the measurement window.

In this case, the changed measurement window may be a value less than or equal to the maximum TA value considering the coverage of the neighboring BS. That is, this TA value may be determined as a specific calculated value (the maximum TA value, a value obtained by reflecting a predefined fixed offset in the maximum TA, a fixed offset value, or zero), and the BS may explicitly indicate the same to the UE. If the timing position of the measurement window overlaps with the preceding symbol, the symbol before the symbol in which the measurement window is executed may be punctuated in order to address the issue of overlapping. The BS may explicitly or implicitly indicate the punctuating pattern and the related rate matching pattern to the UE.

Proposal 7

Based on the information configured in Proposal 6 above, the UE may change the timing of the measurement window and perform CLI measurement. After performing the CLI, the UE may report an RSRP/RSSI result to the BS, which may be periodic/aperiodic.

The receiving UE may measure CLI based on the timing of the measurement window, and may transmit a CLI measurement report to the BS based on the measured CLI.

It is apparent that Proposals 4 to 7 disclosed above may be jointly performed. For example, the transmitting UE may change the SRS transmission timing and the receiving UE may change the timing of the measurement window at the same time.

Proposal 8

For RSRP (or RSSI)-based UE-to-UE CLI measurement, an SRS transmission beam may be configured to be identical to a beam used (or to be used) on PUSCH, and the BS may configure an SRS for the UE.

The SRS configuration information may include information about a plurality of SRS resource sets and a plurality of SRS resources. Information indicating that the SRS transmission beam is configured to be identical to the PUSCH beam may be included in each of the plurality of SRS resource sets. Each of the plurality of SRS resource sets may include a configuration for the SRS transmission beam.

Proposal 9

For RSRP-based UE-to-UE CLI measurement, to determine the time position of SRS transmission, an intended DL/UL configuration received from a neighboring BS through Xn may be referenced, or a DL/UL configuration signaled from a higher layer may be referenced. Alternatively, The BS may configure the time/frequency location of the SRS differently from the existing SRS for the UE such that the SRS may be transmitted in a preceding symbol before the 6 symbols of a slot that is determined to be appropriate for sounding by the UE.

Proposal 9-1

In order to configure the time/frequency location of the SRS, the BS may add an offset value to the time/frequency location of the existing SRS, and explicitly indicate the same to the UE.

Proposal 9-2

In configuring the time/frequency location of the SRS, if there is a set value (e.g., a specific time position of the SRS in Proposal 9, a specific beam value of the SRS in Proposal 8, or a predefined sequence value, etc.) indicating that the SRS is configured for CLI measurement, a preset offset value may be applied to the time/frequency location of the existing SRS. That is, the BS may implicitly indicate the location to the UE.

Proposal 10

For flexible duplex, a BS may (mutually) exchange information about actually transmitted SSB and RACH configuration with a neighboring BS through an X2 interface.

Since the intended DL/UL configuration information received from the existing neighboring BS is not a constraint, the actual DL/UL transmission direction with respect to the neighboring BS may be changed at any time. However, since the actually transmitted SSB and RACH configuration specified above represent the actual DL transmission direction/UL transmission direction of the neighboring BS, an actually used DL/UL transmission direction of the neighboring BS may be estimated instantaneously. Therefore, the BS may consider the direction of the actually transmitted SSB and RACH configuration preferentially over the intended DL/UL configuration received from the neighboring BS.

Proposal 11

Another possible option for configuring the intended DL/UL transmission direction configuration is to combine the TDD DL/UL configuration, the SSB configuration and the RACH configuration. In this sense, the period of the intended DL/UL transmission direction configuration should be defined as at least multiple periods in common to the TDD DL/UL configuration, the SSB configuration, and the RACH configuration.

Referring to FIG. 20, an effective intended DL/UL transmission direction configuration to which the above-described approach is applied may be obtained.

In the figure, it may be assumed that "repPeriod=3 ms", "numerConfig=15 kHz (i.e., the number of symbols in repPeriod is 42)", "numSymBasicTimeUnit=14 symbols", "direcInfo for 1st BTU=DDDDFFFFFFUUUU", "direcInfo for 2nd BTU"=DDDDFFFFFFUUUU", and "direcInfo for 3rd BTU=DDDDFFFFFFUUUU". Moreover, the actually transmitted SSB symbols are the "SSs" of the fifth symbol of the 1st BTU. The RACH configuration is "RRRR" of the ninth symbol of the 3rd BTU slot. "D", "U", "F", "S", and "R" represent "DL", "UL", "Flexible", "SSB", and "RACH", respectively.

1.1. Remaining Issues on CLI-RSSI Measurement

The CLI-RSSI measurement among a plurality of UEs in different cells may require to adjust measurement signals of a plurality of gNBs because a UE in one cell should observe the aggregated measurement signals transmitted from other UEs in other cells. In this sense, configuring individual IMR for each UE-to-UE pair may not be efficient as individual UE-to-UE interference level and scheduling between two UEs change dynamically whereas measurement overhead is significant.

Therefore, more efficient configuration, such as cell-common and/or group-common SRS and/or measurement resource configuration, should be considered in order to reduce control overhead. For example, a cell-common and/or UE group-common IMR may be configured for UEs in one serving cell, and they may measure the aggregated UE-to-UE CLI on the measurement resource. In terms of IMR configuration, it may be configured in the resources for the intended UL resource of an aggressor cell, or the aggressor cell may indicate IMR configuration based on the allocated SRS configurations of the aggressor UEs. Either way, the IMR configuration may be exchanged among gNBs, and a gNB may determine the IMR configuration considering the information of a neighboring gNB (i.e., intended DL/UL transmission direction configuration, fixed DL/UL transmission direction configuration resource allocation information, etc.) to avoid overlapped IMR resources for accurate CLI measurement.

Proposal 12: IMR Resource Configuration for UE

Configuration information (i.e., time/frequency location and/or time/frequency offset and/or durations) for measurement resource elements (such as IMR) may be exchanged between gNBs/TRPs through backhaul signaling.

Based on the information, a serving gNB configures a set of IMR resources. Each IMR configuration may be associated with a single TRP if necessary.

To separate IMR resources between TRPs, the gNB/TRP request that the neighboring gNB/TRP be muted on a specific set of resources.

If a cell-common and/or group-common measurement resource element is considered for UE-to-UE CLI measurement, a UE may measure aggregated interferences from UEs of each gNB for other gNBs. To support this, measurement resource elements for UE-to-UE CLI need to be configured separately for each gNB, and need to be differentiated from separate measurement resources for interference measurement from other gNBs.

Furthermore, the network may assign measurement resources to different sub-bands. Each sub-band (and/or a set of sub-bands) may be associated with a different aggressor UE (or a set of UEs). As mentioned above, the aggressor UE does not need to know the sequence and RE mapping information of the measurement resource elements of the victim UE. This may require a UE to report sub-band RSSI instead of wideband RSSI, which may cause reporting overhead. In order not to increase the reporting overhead too much, the worst 1 or worst M may be reported. In the operation, a sub-band index may also be reported with the RSSI measurements. From the UE perspective, victim UEs may report measurement results by measuring (average or instantaneous) RSSI on the measurement resource to utilize to avoid severe UE-to-UE CLI by the scheduling and coordination techniques as mentioned above.

It is also noted that not all UEs need to measure and report UE-to-UE CLI measurements based on RSSI, as some UEs may not excessively undergo interference. In this sense, any refinement of RSSI may not be attempted until the UE is identified as a victim UE by wideband RSSI (coarse RSSI). Thereafter, finer measurements or even RSRP measurements may be attempted for the victim UE. In other words, different measurements (not fine measurement) may be performed to identify victim UEs and measure the actual levels of interference interfering with UEs.

Proposal 13: When RSSI is measured for a set of UEs from a gNB, further refinement based on sub-band RSSI may be considered. A different sub-band may be associated with a different set of UEs. Multiple sub-bands (or multiple sets of sub-bands) may correspond to multiple sets of UEs, respectively.

Proposal 14: Different measurements for identifying aggressor UEs may be considered. For example, wideband RSSI may be used to identify victim UEs, and sub-band RSSI may be used to identify aggressor UEs.

For IMR configuration details, it may be generally preferred to utilize existing features if possible. Particularly, it is necessary that IMR resources configured for some UEs may be rate-matched for PDSCH transmission of other UEs, particularly Rel-15 UEs. Rel-15 may support two types of rate matching patterns: (1) a rate matching pattern for CSI-RS/CSI-IM and (2) a rate matching pattern of RB/symbol level. When a UE measures RSSI on resources used for SRS transmissions, the RB/symbol level IMR pattern may be more appropriate. Given that CSI-RS would not be used for CLI measurement, it is proposed to use the RB/symbol level rate matching pattern and IMR pattern. The existing RB/symbol level rate matching pattern may be considered to be reused to configure the IMR pattern as a starting point.

Proposal 15: Existing rate matching patterns may be reused for IMR configuration of CLI-RSSI unless considerable issues are identified.

1.2. Remaining Issues on SRS-RSRP Measurement

There are remaining issues on SRS-RSRP measurement. First topic is whether a UE is required to perform constant offset relative to its own DL timing or not in order to perform SRS-RSRP measurement. In CLI measurement framework, the received SRS signal from other UEs may not be synchronized from the receiver UE perspective. The amount of timing misalignment depends on two factors. One factor is distance between the transmitter UE and receiver UE and the other factor is the different TA value of the transmitter UE. The serving gNB may not know either the location of UEs and the relative distances among UEs. Accordingly, it is very difficult to estimate the optimal timing for increasing detection performance Based on the above agreement, a fixed offset value (involving the offset value equal to zero) rather than time tracking or timing adjustment of the UE's measurement window may be considered. In the present disclosure, the fixed offset values may be discussed regarding how many fixed offset values are needed and how to define the exact value of the fixed offset. However, the fixed offset value cannot resolve the timing misalignment due to the various different arrival timings of SRS from other aggressor UEs.

For example, the UE may receive one SRS signal from a pico-cell/micro-cell/small-cell UE that is located at a relatively far distance (with a small TA value) and also simultaneously receive an SRS signal from a macro-cell UE that is located at a relative close distance (with a large TA value). In this case, there may be no optimal offset value in the measurement window because time difference between the two received SRS signals is excessively large. Furthermore, for the same reason, it is difficult to find the optimal offset value of SRS transmission from the transmitter UE perspective.

From the performance perspective, with zero offset (i.e., the UE performs a normal action with its own DL timing), the UE may calculate RSRP based on the interference from the serving gNB and a neighboring gNB. Furthermore, in NR, the SRS may be configured with comb-2 and comb-4. Comb-2 and comb-4 resources may be mapped to a single symbol and may have 4 or 2 time domain repetitions within a symbol. Since there is a repetition structure within one symbol, the UE may measure the SRS when the timing mismatch is about half symbol.

Proposal 16: The transmitting UE and the receiving UE perform normal behavior in terms of transmitting timing and receiving timing without any fixed offset. Furthermore, shifting the CLI measurement window may be a UE implementation issue from the receiving UE perspective.

Another remaining topic is SRS-RSRP configuration. From the receiving UE perspective, restricting some SRS functions may be beneficial in lowering the receiving UE complexity.

# of ports: The total number of ports of SRS does not exceed 1.

In NR SRS, up to 4 ports are supported for beam management. In terms of L3 based UE-to-UE CLI measurement result, however, a beam related measurement result may not useful due to the changing environment of the UE (UE rotation and/or UE movement). Therefore, it is useful to restrict the number of ports to reduce UE complexity.

# of symbols: Up to 4

In NR, 4 consecutive symbols per SRS resource are supported.

Bandwidth

In NR, a tree-like SRS bandwidth set table is supported with $B_{SRS}$ and $C_{SRS}$ values, where $B_{SRS}=\{0, 1, 2, 3\}$ and $C_{SRS}=\{0, 1, 2, \ldots, 62, 63\}$.

Sequence: The total number of SRSs to be monitored by the UE should not exceed 32.

Periodicity: For a resource type, only periodic and/or semi-static configuration is supported.

In NR, aperiodic SRS transmission is supported. For L3 measurement, however, only periodic SRS transmission is supported.

Periodicity value: 320, 640, 1280, 2560

In NR, many periodicities (e.g., 2, 5, 10, 20, 40, 80, 160, 320, 640, 1280, 2560 slots) are supported. For L3 measurement, however, a short periodicity is not necessary due to high overhead.

Transmission power: May be the same as that of PUSCH.

Beam: May be the same as PUSCH.

Proposal 17: The relaxed configuration for SRS-RSRP may be needed to reduce receiving UE complexity. At least the following information may be involved in SRS-RSRP configuration.

Time/frequency location
Comb type
Bandwidth
Periodicity

1.3. Remaining Issues on Reporting Procedure for Measurement Results

In terms of measurement reporting, there is a tradeoff between reporting overhead (i.e., periodicity and/or quantity and/or quality) and system performance Similar to current RSRP/RSRQ reports, some event driven reports may be considered for UE-to-UE CLI measurement reporting with low complexity. As a simple example, in order to reduce reporting overhead and UE resources for reporting, the UE may report CLI measurement results to the serving gNB only when the measurement results exceed a predefined threshold.

As agreed in the RAN1 #90 meeting, CLI measurement and reporting may be configured to be semi-statically set to ON or OFF. The semi-static mechanism may be useful for reducing UE power consumption and increasing CLI measurement accuracy by collecting measurement results from strongly interfered UEs which are located at the cell edge. For example, to determine ON/OFF UE-specifically, the UEs may implicitly turn on the measurement and reporting procedure when the measured signal quality from the serving cell is less than the preset threshold (or vice versa).

Proposal 18: UE-to-UE CLI measurement and reporting procedure may be implicitly turned on/off based on the measured signal quality from the serving cell.

2.1. Details on Intended DL/UL Transmission Direction Configuration

At least the following list of information may be included in the "intended DL/UL transmission direction configuration". The main purpose of this approach is to provide more detailed information on how to manage the duplexing flexible operation. Such detailed information may be used efficiently to avoid and mitigate the cross-link interference.

In NR, there are three types of resource directions: hard-downlink (hard-DL), hard-uplink (hard-UL) and flexible resources. The hard-DL and hard-UL may be indicated by cell-specific DL/UL configuration and UE-specific signaling. The cell-specific DL/UL configuration may include 'periodicity', 'the number of slots and symbols for hard-DL', 'the number of slots and symbols for hard-UL', and the numerology used for the configuration. Undefined resources between the hard-DL and the hard-UL may be considered as flexible resources. Similar configuration may be used for intended DL/UL. It is good to know which resources are hard-DL and hard-UL between gNBs and also intended DL/UL partitioning on flexible resources. One approach is to use two configurations for each of the hard-DL/hard-UL and the soft-downlink/soft-uplink. One approach is to utilize two configurations for hard-DL/hard-UL and soft-DL/soft-UL respectively. For example, hard-DL/hard-UL may be indicated by exchanging cell-specific DL/UL configuration. For the soft-downlink/soft-uplink configuration, UE-specific DL/UL configurations may be reused to indicate the 'intended DL/UL configuration'. The intended DL/UL configuration is understood as meaning that the configuration may be dynamically changed depending on traffic conditions. However, there is high possibility that the network will utilize resources based on the indicated configuration.

Proposal 19: The following list of information may be included in the "intended DL/UL transmission direction configuration".

Periodicity information (repReriod)

The indicated "intended DL/UL TX direction configuration" may be repeatedly applied based this periodicity.

Numerology information (i.e., subcarrier spacing, cyclic prefix type if necessary, etc.) (numerConfg)

This implies the total number of symbols within repPeriod.

Direction information (directInfo)

This indicates the transmission direction (or usage) of each symbol constituting a basic time unit (BTU). In other words, direcInfo is signaled on a BTU basis.

UE-to-UE Measurement & Reporting in UE

Based on the previous agreement, FFS points will be reviewed. A first topic relates to whether to support both or one of RSRP and RSSI. Based on pros and cons discussed below, it may be preferable that RSSI is supported only.

SRS-RSRP

Compared to RSSI, one of the major advantages of RSRP is to distinguish interference sources. For instance, interference between DL and UL, interference among a plurality of aggressors and the like can be distinguished. Yet, such a gain is obtained by RSSI appropriately configured in a specific range. For example, in order for a network to measure interference from UL aggressors only, blank resources may be configured in IMR. To solve UE complexity in measurement, groping mechanisms may be discussed. Once grouping is used, a gain of RSRP is reduced and a difference is decreased in comparison to RRSI. On the other hand, implementation complexity of a new measuring method based on an SRS is higher than RSSI. Moreover, if the standard supports a lot of groups (e.g., RSRP in each UE), complexity increases more. To match the balance of UE complexity while maintaining a gain of RSRP, if agreed, it is very necessary to agree with the maximum number of configuration/measurement for RSRP and evaluation between UE complexity and gain is further requested. Another issue related with RSRP is to handle a timing. If timings between a DL signal from a gNB and SRS signals in UES are not aligned, a quality of an SRS for each UE may be degraded considerably and a CKI-RSRP measurement result may not be useful for CLI measurement. To minimize overhead and solve the timing issue, an additional UE-group SRS transmission configuration idea may be proposed. A prescribed UE may not identify each interference link between two UEs. Instead, a UE may make 'added-up' CL_RSRP measurement from several UEs. Yet, still, in case of other Timing Advances (TAs) among UEs, a performance aspect of the added-up RSRP may need an additional investigation. Moreover, although IMR configuration for CLI-RSSI measurement is usable in distinguishing a group of UEs or another gNB, an added-up gain of CKI-RSRP may be unclear.

Proposal 20: For CLI-RSRP measurement, it is necessary to clearly quantify an effect that time tracking and time adjustment affect SRS detection performance (e.g., relationship between measurement accuracy and time asynchronization). In addition, despite the UE measurement load, gains of CLI-RSRP still need to be further justified.

CLI-RSSI: Although CLI-RSSI measurement fails to give information on identities of aggressor UEs, it may be used to simplify interference measurement. With respect to CLI-RSSI, an Interference Measurement Resource (IMR) may become a potential technology for UE-to-UE CLI measurement. In using the IMR, a victim UE only measures added-up interference, by linearly averaging total reception power observed from measurement resource elements, from aggressor UEs. Since the UE does not need to identify other aggressor UEs and the measurement can be performed for the added-up interference from a plurality of UEs instead of separation per individual UE, CLI-RSSI measurement has relatively low UE complexity in comparison to CLI-RSRP. To reduce UE complexity and embodiment influence, at least one CLI-RSSI may be considered for UE-to-UE CLI measurement. When it is necessary to distinguish gNBs or distinguish a group of UEs from another group of UEs, a plurality of IMR configurations may be considered. Each of the IMR configurations may be mapped to a single group of UEs or gNBs. If CLI-RSSI measurement is used with the appropriate IMR configurations from this perspective, necessary identification such as identifying an aggressor gNB or an aggressor group of UEs without considerably increasing a load of a UE in measurement.

Proposal 21

For UE-to-UE CLI measurement, to reduce complexity (e.g., UE detection complexity, restriction of SRS resources, asynchronization issues, etc.) and embodiment influence, in NR, at least CLI-RSSI may be considered as a measurement metric. When each IMR is related to a single identifier (i.e., a gNB or a group of UEs), a plurality of IMR configurations may be supported. The IMR configuration may be defined according to a similar method of SRS configuration, or an IMR may be configured using an SRS configuration. Alternatively, an IMR configuration may be defined separately from an SRS configuration.

Since a UE of a single cell should observe added-up measurement signals transmitted from other UEs of other cells, CLI-RSSI measurement in a plurality of UEs of other cells needs adjustment of measurement signals of a plurality of gNBs. In this sense, measurement overhead is important. Meanwhile, an individual UE-to-UE interference level and a since scheduling between two UEs change dynamically, it may be inefficient to configure an individual IMR for each UE-to-UE pair. Therefore, like cell-common and/or group-common SRS and/or measurement resource configuration, in order to reduce control overhead, more efficient configuration should be considered. For example, a cell-common and/or UE group-common IMR may be configured for UEs in a single serving cell, and the UEs may measure added-up UE-to-UE CLI in a measurement resource. In aspect of IMR configuration, IMR may be configured in resources for an intended uplink resource of an aggressor cell. Alternatively, an aggressor cell may indicate an IMR configuration based on the allocationed SRS configuration of the allocationed aggressor UEs. In any way, IMR configuration information may be exchanged between gNBs, and a gNB may determine an IMR configuration to prevent overlapping of IMR resources for the accurate CLI measurement in consideration of information of an adjacent gNB. The IMR configuration may include at least one of an intended DL/UL transmission direction configuration, a fixed DL/UL transmission direction configuration, and a resource allocation information.

Proposal 22

Configuration of IMR Resources for UE

Between gNBs/Tx/Rx Points (TRPs), configuration information (e.g., time/frequency location and/or time/frequency offset and/or time intervals (durations)) for measurement resource elements such as an IMR and the like may be exchanged via backhaul signaling.

Based on the configuration information, a serving gNB may configure a set of IMR resources. If necessary, each IMR configuration may be related to a single TRP.

To separate IMR resources between TRPs, a gNB/TRP requests a neighboring gNB/TRP to keep silent in a specific set of resources.

If a cell-common and/or group-common measurement resource element is considered for UE-to-UE CLI measurement, a UE may measure added-up interferences from UEs of each gNB for other gNBs. To support this, measurement resource elements for UE-to-UE CLI need to be configured in a manner of being separated per gNB. The each gNB may need to be distinguished from measurement resources for interference measurement of gNBs.

Furthermore, a network may allocate measurement resources on different sub-bands. Each of the different sub-bands (or a set of sub-bands) may be related to another aggressor UE (or a set of UEs). As described above, an aggressor UE may not need to know a sequence and RE mapping information of measurement resource elements of a victim UE. Yet, a UE may be requested to report a sub-band RSSI instead of a wideband RSSI. Such a request may cause a reporting overhead. To prevent the reporting overhead from being increased excessively, 'worst 1' or 'worst M' may be reported. A sub-band index may be reported as well together with RSSI measurements. From the perspective of a UE, as described above, in order to avoid serious UE-to-UE CLI by the scheduling and adjustment technique, victim UEs may report measurement results by estimating an (averaged or instantaneous) RSSI in a used measurement resource.

It should be noticed that all UEs make UE-to-UE CLI measurements based on RSSI but fail to report them. Some UEs may not experience interference excessively. In that sense, until a UE is identified as a victim UE that can be first identified by wideband (or sparse) RSSI measurement, refinement of RSSI may not be attempted.

Proposal 23

When an RSSI is measured for a set of UEs from a gNB, further refinement may be considered based on a sub-band RSSI. Another sub-band may be related to another set of UEs. Namely, a plurality of sub-bands may correspond to a plurality of sets of UEs.

Proposal 24: Other Measurements for Identifying Aggressor UEs

For example, a wideband RSSI may be used to identify victim UEs and a sub-band RSSI may be used to identify aggressor UEs in detail.

For the details of IMR configuration, if possible, it may be preferable to use the existing features in general. Particularly, IMR resources configured for some UEs may need to be rate-matched for PDSCH transmission of other UEs. This is because CLI-RSSI may not be measured by all UEs, and more particularly, by Rel-15 UEs. Rel-15 may provide two types of rate matching patterns. The two types include: (1) a rate matching pattern for CSI-RS/CSI-IM; and (2) a rate matching pattern of an RB/symbol level. When a prescribed UE measures an RSSI in resources used for SRS transmission, an RB/symbol level IMR pattern may be more appropriate. If CSI-RS is not used for CLI measurement, it is proposed to use an RB/symbol level rate matching pattern and IMR pattern. The existing RB/symbol level rate matching pattern may be considered to be reused to set an IMR pattern as a starting point.

Proposal 25

If a considerable issue is not identified, the existing rate matching patterns may be reused for IMR configuration of CKI-RSSI.

From the perspective of measurement reporting, there may exist a trade-off between reporting overhead (e.g., periodicity and/or quantity and/or quality) and system performance. Similarly to the current RSRP/RSRQ reports, reports attributed to a certain event may be considered for a UE-to-UE CLI measurement report of low complexity. For one simple example, to reduce UE resources for reporting and a reporting overhead, a UE may report CLI measurement to a serving cell only if a measurement result exceeds a prescribed predetermined threshold.

As agreed in the RAN #90 conference, the CLI measurement and reporting may be set to semi-statically or UE-specifically ON or OFF. Such a mechanism collects measurement results from UEs positioned at a cell edge to receive string interference, thereby reducing UE power consumption and raising CLI measurement accuracy advantageously. For example, to determine ON/OFF as 'UE-specifically', when a signal quality measured from a serving cell is smaller than a preset threshold (or, to the contrary), UEs may activate a measurement and reporting procedure.

Proposal 26

A UE-to-UE CLI measurement and reporting procedure may be implicitly activated/deactivated based on a signal quality measured from a serving cell.

1.1. Details of Intended DL/UL Transmission Direction Configuration

As agreed in the RANI #90 conference, for Cross-Link Interference (CLI) mitigation, NR supports that at least DL/UL transmission direction configuration can be exchanged via backhaul signaling. The following information list may be included in 'intended DL/UL transmission direction configuration' at least. The main purpose of such an access is to provide more specific information on a method of managing a duplexing flexibility operation. Such specific information may be used efficiently to avoid and mitigate a CLI.

In NR, there are resource directions of three types, i.e., a hard-DL (hard-DL) resource, a hard-UL (hard-UL) resource, and a flexible resource. The hard-DL and the hard-UL may be indicated by cell-specific DL/UL configuration and UE-specific signaling. The cell-specific DL/UL configuration may include 'periodicity', 'numbers of slots and symbols for hard-DL', 'numbers of slots and symbols for hard-UL', and numerology used for configuration. An undefined resource between hard-DL and hard-UL may be considered as a flexible resource. Similar configuration may be used for intended DL/UL. Which resource is hard-DL or hard-UL and partitioning of intended DL/UL in flexible resources need to be known between gNBs. According to one approach, two kinds of configurations for each of hard-DL/ hard-UL and soft-DL/soft-UL are used. For instance, by exchanging cell-specific DL/UL configuration, hard-DL/ hard-UL may be known. For soft-DL/soft-UL configuration, UE-specific DL/UL configuration may be reused to indicate 'induced DL/UL configuration'. The induced DL/UL configuration may be understood as the configuration is changeable dynamically based on the traffic condition. Yet, it is highly probable that a network will use resources based on the indicated configuration.

Proposal 27

To indicate hard-DL/hard-UL fixed as DL and UL respectively by a given gNB, a signaling mechanism used in cell-specific DL/UL configurations may be used. Signaling mechanisms used in UE-specific DL/UL configurations may be used to indicate soft-DL and soft-UL intended to be used for DL and UL, respectively.

Period information (repReriod)

The indicated 'intended DL/UL transmission direction configuration' is repeatedly applicable based on this period.

Numerology information (i.e., subcarrier spacing, if necessary, cyclic prefix type, etc.) (numerConfg)

This implicates the total number of symbols in repPeriod.

Direction information (direcInfo)

This indicates a transmission direction (or usage) of each symbol configuring a Base Time Unit (BTU). In other words, direcInfo is signaled based on BTU.

FIG. 19 is an exemplary diagram to describe an intended DL/UL transmission direction configuration.

Referring to FIG. 19, "repPeriod=3 ms", "numerConfig=15 kHz (i.e., # of symbols in repPeriod is 42)", "numSymBasicTimeUnit=14 symbols", "direcInfo for 1st BTU=DDDDDDDGUUUUUU", "direcInfo for 2nd BTU=DDDDDDDDDDGUUU", "direcInfo for 3rd BTU=DDDDDDDDDGUUUU" may be assumed. "D", "U", and "G" indicate "DL", "UL", "GP (guard period)", respectively.

As described above, a first Base Time Unit (BTU) may be "DDDDDDDGUUUUUU", a second BTU may be "DDDDDDDDDDGUUU", and a third BTU may be "DDDDDDDDDGUUUU". In unit of 3 ms, the first to third BTUs may be repeated. Each BTU is 1 ms and may include 14 symbols. Configurations of the first to third BTUs are exemplary and may have various values according to UE-specific DL/UL configuration or cell-specific DL/UL configuration.

2.2. Details on Effective Intended DL/UL Transmission Direction Configuration In the above agreement in RANI NR Ad-hoc #1, it may be needed to further check the TDD DL/UL configuration, synchronization signal block (SSB) configuration and RACH configuration. The symbol location information of the actually transmitted synchronization signal may be represented by DL symbol if the intended DL/UL transmission direction configuration indicates that the symbol is flexible or unknown. The information of RACH configuration indicates the potential location of the RACH signal and this location may be represented by UL symbol if the intended DL/UL transmission direction configuration indicates that the symbol is flexible or unknown.

Another possible option for configuring the intended DL/UL transmission direction configuration is to combine the TDD DL/UL configuration, the SSB configuration and the RACH configuration. In this sense, the period of the intended DL/UL transmission direction configuration should be defined as at least multiple periods in common to the TDD DL/UL configuration, the SSB configuration, and the RACH configuration.

FIG. 20 is an exemplary diagram illustrating an effective intended DL/UL transmission direction configuration.

Referring to FIG. 20, an effective intended DL/UL transmission direction configuration to which the above-described approach is applied may be obtained.

In the figure, it may be assumed that "repPeriod=3 ms", "numerConfig=15 kHz (i.e., the number of symbols in repPeriod is 42)", "numSymBasicTimeUnit=14 symbols", "direcInfo for 1st BTU=DDDDFFFFFUUUU", "direcInfo for 2nd BTU"=DDDDFFFFFUUUU", and "direcInfo for 3rd BTU=DDDDFFFFFUUUU". Moreover, the actually transmitted SSB symbols are the "SSs" of the fifth symbol of the 1st BTU. The RACH configuration is "RRRR" of the ninth symbol of the 3rd BTU slot. "D", "U", "F", "S", and "R" represent "DL", "UL", "Flexible", "SSB", and "RACH", respectively.

Proposal 28: The intended DL/UL configuration may be determined using the TDD DL/UL configuration, the actually transmitted SSB configuration, and the RACH configuration.

Proposal 29

The following information list may be included in 'intended DL/UL Transmission (Tx) direction configuration'.

Period information (repPeriod)
Based on the above period, the indicated 'intended DL/UL Tx direction configuration' is applied.
Numerology information (e.g., subcarrier spacing, if necessary, Cyclic Prefix (CP) type, etc.)
This may indicate the total number of symbols in repPeriod.
Basic Time Unit (BTU) (i.e., number of symbols in slot, numSymBasicTimeUnit)
Direction information (direcInfo)
This indicates a basic transmission direction (or usage) of each symbol that configures a BTU. In other words, direcInfo is signaled based on BTU.

1.2. Information Exchange Between gNBs for Network Adjustment Mechanism

Although a Time Division Duplex (TDD) Enhanced Interference Mitigation and Traffic Adaptation (eIMTA) operation is applied in LTE system, there always exist resources having a fixed DL/UL Tx direction. So, from the perspective of a prescribed gNB, a region of such resources of a neighbor gNB may be regarded as Cross-Link Interference (CLI) free, which may be used for its essential channel/signal transmission (e.g., control/broadcast channel, synchronization signal, etc.). In this sense, in the NR system, if information on resources having a fixed DL/UL Tx direction is additionally exchanged between gNBs via backhaul signaling, it may be useful in aspects of scheduling plan, essential channel/signal transmission/protection, cross-link interference management, etc.

Proposal 30

For essential channel/signal transmission/protection, NR may support the following information exchange via backhaul signaling between gNBs in addition.

Indicator of resources having a fixed DL/UL Tx direction.

To support CLI management, the information exchange between gNBs via backhaul signaling may be essential. At least the following information may be useful in adjusting gNBs for CLI.

Reference signal configuration (e.g., time and frequency locations, time offset, frequency offset, sequence information, RS repetition count, power related parameters, etc.).
Cell/group/user ID of aggressor/victim UEs.
CLI measurement results.
Scheduling information.
TPC related information (e.g., power backoff level, power boosting level, # of symbols).
Beam-specific information (e.g., high interference Tx beam of aggressor UE, high interference Rx beam of victim UE).

Proposal 31

Regarding backhaul signaling, at least the following information may be considered for CLI management.

Reference signal configuration
Cell/group/user ID of aggressor/victim UEs
CLI measurement results
Scheduling information
TPC related information
Beam-specific information Regarding reference signal configuration, as described above, 'UE-to-UE CLI measurement resource (IMR)' (e.g., similarly to zero-power CSI-RS configuration of LTE system) may be exchanged between gNBs via backhaul signaling.

Thus, an aggressor gNB may efficiently configure reference signal transmission (e.g., SRS) of a UE by aligning it at an IMR location of a victim gNB. By aligning the SRS at the IMR location of the victim gNB, it is able to secure more accurate UE-to-UE CLI measurement of UEs in the victim gNB. Moreover, the above-described method may avoid a problem that IMRs between other gNBs overlap with each other and a problem that UE-to-UE CLI is not measured accurately, which are difficult to solve. For example, ye, the IMR information may include a frequency location (or pattern) of an IMR in a basic time unit, periodicity, a subframe offset (or slot offset) of IMR repetition (i.e., an IMR pattern of a basic time unit may be repeated based on the period), etc.

Proposal 32

To support RSSI-based UE-to-UE CLI measurement, at least the following information on 'UE-to-UE CLI measurement resource (IMR); may be exchanged between gNBs via backhaul signaling.

Frequency location (or pattern) of IMR in basic time unit (i.e., slot)
Periodicity and subframe offset of IMR repetition (i.e., IMR pattern of a basic time unit is repeated based on a period).

FIG. 21 is an exemplary diagram to describe a procedure for transmitting an SRS according to the present disclosure.

In a wireless communication system according to the present disclosure, by a User Equipment (UE), for cancelling or mitigating remote Cross-Link Interference (CLI), a method of transmitting a Sounding Reference Signal (SRS) may include receiving a Channel State Information-Reference Signal (CSI-RS) from a base station, transmitting a CSI report including a Channel Quality Indicator (CQI) to the base station based on the received CSI-RS, receiving a first configuration information from the base station, the first configuration information generated based on the CQI, receiving a second configuration information including an SRS configuration from the base station, and transmitting the SRS based on the first configuration information and the second configuration information.

The SRS configuration (SRS config) information may include information on SRS resource sets, first SRS resource set identifiers corresponding to the SRS resource sets, respectively, information on SRS resources, and SRS resource identifiers corresponding to the SRS resources, respectively.

Each of the SRS resource sets may include at least one of a second SRS resource set identifier, identifiers of SRS resources respectively included in the SRS resource sets, a first resource type, a usage, an alpha, a power, a path loss reference RS, or an SRS power control adjustment state value.

The path loss reference RS may include at least one of a synchronization signal block index (ssb-index) or a channel state information reference signal (csi-rs-index).

The SRS power control adjustment state value may indicate that an SRS transmission power is configured equal to a PUSCH transmission power.

The SRS power control adjustment state value may indicate that an SRS transmission power is configured per SRS resource set.

If the SRS power control adjustment state value indicates that the SRS transmission power is configured per SRS resource set, the same SRS transmission power may be configured for all SRS resource sets.

The SRS may be transmitted based on the CQI including information indicating that the UE is positioned at an edge of a cell of the base station.

The SRS may not be transmitted based on the CQI including information indicating that the UE is positioned at a center of a cell of the base station.

The first resource type may indicate one of aperiodic SRS configuration, semi-persistent SRS configuration and periodic SRS configuration.

The usage may indicate one of beam management usage, codebook usage, non-codebook usage, and antenna switching usage.

The usage may indicate one of beam management usage, codebook usage, non-codebook usage, antenna switching usage and UE-to-UE interference measurement usage.

Each of the SRS resources may include at least one of an SRS resource identifier, the number of SRS ports, a Phase Tracking Reference Signal (PTRS) port index, a transmission comb, resource mapping information, a frequency domain location, a frequency domain shift value, frequency hopping information, information indicating whether to be group hopping or sequence hopping, a resource type, a sequence identifier, or spatial relationship information.

In a wireless communication system according to the present disclosure, a User Equipment (UE) transmitting a Sounding Reference Signal (SRS) for mitigating remote Cross-Link Interference (CLI) may include a transceiver connected to at least one processor and the at least one processor configured to receive a Channel State Information-Reference Signal (CSI-RS) from a base station, transmit a CSI report including a Channel Quality Indicator (CQI) to the base station based on the received CSI-RS, receive a first configuration information from the base station, the first configuration information generated based on the CQI, receive a second configuration information including an SRS configuration from the base station, and transmit the SRS based on the first configuration information and the second configuration information.

The user equipment may be mounted on an autonomous driving device communicating with at least one of a mobile terminal, the base station or an autonomous driving vehicle.

FIG. 22 is an exemplary diagram to describe a procedure for receiving an SRS according to the present disclosure.

In a wireless communication system according to the present disclosure, by a Base Station (BS), for mitigating remote Cross-Link Interference (CLI), a method of receiving a Sounding Reference Signal (SRS) may include transmitting a Channel State Information-Reference Signal (CSI-RS) to a User Equipment (UE), receiving a CSI report corresponding to the CSI-RS and including a Channel Quality Indicator (CQI) from the UE, transmitting a first configuration information to the UE, the first configuration information generated based on the CQI, transmitting a second configuration information including an SRS configuration to the UE, and receiving the SRS from the UE, wherein the SRS is generated based on the first configuration information and the second configuration information.

In a wireless communication system according to the present disclosure, a Base Station (BS) receiving a Sounding Reference Signal (SRS) for mitigating remote Cross-Link Interference (CLI) may include a transceiver connected to at least one processor and the at least one processor configured to transmit a Channel State Information-Reference Signal (CSI-RS) to a User Equipment (UE), receive a CSI report corresponding to the CSI-RS and including a Channel Quality Indicator (CQI) from the UE, transmit a first configuration information to the UE, the first configuration information generated based on the CQI, transmit a second configuration information including an SRS configuration to the UE, and receive the SRS from the UE, wherein the SRS is generated based on the first configuration information and the second configuration information.

The base station may be mounted on an autonomous driving device communicating with at least one of a mobile terminal, the base station or an autonomous driving vehicle.

According to the present disclosure, a method for transmitting a sounding reference signal (SRS) by a transmitting user equipment (UE) in a wireless communication system may include: receiving first configuration information including at least one of a timing advance and a timing advance offset from a base station; receiving second configuration information including SRS configuration from the base station; and transmitting an SRS to a receiving UE based on the first configuration information and the second configuration information.

The timing advance may be the same as the downlink reception timing of the receiving UE, and the timing advance offset may be configured to transmit the SRS. The timing advance may have a value corresponding to the downlink reception timing of the receiving UE.

The timing advance may be the same as the uplink transmission timing advance of the transmitting UE, and the timing advance offset may be configured to transmit the SRS.

The SRS configuration may include an indicator indicating that the SRS is for UE-to-UE interference measurement.

The indicator indicating that the SRS is for UE-to-UE interference measurement may be included in each of SRS resource sets included in the SRS configuration.

The method may further include receiving, by the transmitting UE, a channel state information reference signal (CSI-RS) from the base station; and transmitting a CSI report to the base station based on the CSI-RS.

The CSI report may include information indicating that the transmitting UE is within a predetermined distance from a center of a cell of the base station. Based on the information indicating that the transmitting UE is within a predetermined distance from the center of the cell of the base station, the first configuration information may include only the timing advance offset.

The method may further include receiving, by the transmitting UE, a channel state information reference signal (CSI-RS) from the base station; and transmitting a CSI report to the base station based on the CSI-RS.

The CSI report may include information indicating that the transmitting UE is outside a predetermined distance from the center of the cell of the base station. Based on the information indicating that the transmitting UE is outside the center of the cell of the base station, the first configuration information may include both the timing advance and the timing advance offset.

According to the present disclosure, a transmitting user equipment (UE) for transmitting a sounding reference signal (SRS) in a wireless communication system may include a transceiver and at least one processor connected to the transceiver. The at least one processor may be configured to: receive first configuration information including at least one of a timing advance and a timing advance offset from a base station; receive second configuration information including SRS configuration from the base station; and transmit an SRS to a receiving UE based on the first configuration information and the second configuration information.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method of reporting measurement information and user equipment therefor are industrially applicable to various wireless communication systems such as 3GPP LTE/LTE-A system, 5G communication system and the like.

The invention claimed is:

1. A method for transmitting a sounding reference signal (SRS) by a transmitting user equipment (UE) in a wireless communication system, the method comprising:
receiving, from a base station, a channel state information-reference signal (CSI-RS);
transmitting, to the base station, a CSI report based on the CSI-RS, wherein the CSI report includes information indicating that the transmitting UE is located at an edge of a cell of the base station;
receiving, from the base station, first configuration information and second configuration,
wherein, based on the information indicating that the transmitting UE is located at the edge of the cell of the base station, the first configuration information includes only a timing advance offset configured to transmit the SRS,
wherein the second configuration information includes SRS configuration; and
based on the information indicating that the transmitting UE is located at the edge of the cell of the base station, transmitting the SRS to a receiving UE based on the first configuration information and the second configuration information.

2. The method of claim 1, wherein a timing advance to which the timing advance offset is applied for transmitting the SRS is the same as a downlink reception timing of the receiving UE.

3. The method of claim 1, wherein a timing advance to which the timing advance offset is applied for transmitting the SRS is the same as an uplink transmission timing advance of the transmitting UE.

4. The method of claim 1, wherein the SRS configuration includes an indicator indicating that the SRS is for UE-to-UE interference measurement.

5. The method of claim 4, wherein the indicator indicating that the SRS is for UE-to-UE interference measurement is included in each of SRS resource sets included in the SRS configuration.

6. A transmitting user equipment (UE) for transmitting a sounding reference signal (SRS) in a wireless communication system, the transmitting UE comprising:
a transceiver; and
at least one processor connected to the transceiver,
wherein the at least one processor is configured to:
receive, from a base station, a channel state information-reference signal (CSI-RS);
transmit, to the base station, a CSI report based on the CSI-RS, wherein the CSI report includes information indicating that the transmitting UE is located at an edge of a cell of the base station;
receive, from the base station, first configuration information and second configuration, wherein, based on the information indicating that the transmitting UE is located at an edge of the cell of the base station, the first configuration information includes only a timing advance offset configured to transmit the SRS,
wherein the second configuration information includes SRS configuration; and
based on the information indicating that the transmitting UE is located at the edge of the cell of the base station, transmit the SRS to a receiving UE based on the first configuration information and the second configuration information.

7. The transmitting UE of claim 6, wherein a timing advance to which the timing advance offset is applied for transmitting the SRS is the same as a downlink reception timing of the receiving UE.

8. The transmitting UE of claim 6, wherein a timing advance to which the timing advance offset is applied for transmitting the SRS is the same as an uplink transmission timing advance of the transmitting UE.

9. The transmitting UE of claim 6, wherein the SRS configuration includes an indicator indicating that the SRS is for UE-to-UE interference measurement.

10. The transmitting UE of claim 9, wherein the indicator indicating that the SRS is for UE-to-UE interference measurement is included in each of SRS resource sets included in the SRS configuration.

11. The transmitting UE of claim 6, wherein the transmitting UE is mounted on an autonomous driving device configured to communicate with at least one of a mobile terminal, a base station, and an autonomous driving vehicle.

* * * * *